(12) United States Patent
Bingham et al.

(10) Patent No.: US 11,027,853 B2
(45) Date of Patent: *Jun. 8, 2021

(54) DISTRIBUTED CONTROL AND MONITORING SYSTEM FOR MULTIPLE PLATFORMS

(71) Applicant: Rolls-Royce Corporation, Indianapolis, IN (US)

(72) Inventors: Nathan Bingham, Indianapolis, IN (US); Michael T. Elliot, Westfield, IN (US); James McPherson, Bargersville, IN (US); Chris Ruff, Whitestown, IN (US); Andrew Terbrock, Zionsville, IN (US); Kerry Wiegand, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,542

(22) Filed: Aug. 7, 2018

(65) Prior Publication Data
US 2020/0047905 A1 Feb. 13, 2020

(51) Int. Cl.
*B64D 31/06* (2006.01)
*F02C 9/00* (2006.01)
(Continued)

(52) U.S. Cl.
CPC ........... *B64D 31/06* (2013.01); *F01D 21/003* (2013.01); *F01D 21/14* (2013.01); *F02C 9/20* (2013.01);
(Continued)

(58) Field of Classification Search
CPC ....... B64D 31/06; F01D 21/003; F01D 21/14; F02C 9/20; F05D 2270/09; F05D 2270/54;
(Continued)

(56) References Cited

U.S. PATENT DOCUMENTS 6,353,790 B1 3/2002 Tsuzuki
6,480,780 B1 11/2002 Schwamm
(Continued)

FOREIGN PATENT DOCUMENTS

EP 2244148 A1 4/2010
EP 2644869 A2 3/2013
(Continued)

OTHER PUBLICATIONS

Office Action from U.S. Appl. No. 16/057,526, dated Dec. 2, 2019, 11 pp.
(Continued)

*Primary Examiner* — Peter D Nolan
*Assistant Examiner* — Demetra R Smith-Stewart
(74) *Attorney, Agent, or Firm* — Shumaker & Sieffert, P.A.

(57) ABSTRACT

Control systems and methods for controlling an engine. The control system includes a computation module and an input/output (I/O) module attached to the engine. The computation module is located in an area of the engine, or off-engine, that provides a more benign environment than the environment that the I/O module is subject to during operation of the engine. The I/O module includes a first processor and a first network interface device. The computation module includes a second processor with higher processing power than the first processor, and a second network interface device. The control system also includes a sensor configured to provide sensor readings to the first processor. The first processor transmits data based on the sensor readings to the second processor. The control system also includes an actuator operably coupled to the I/O module and that is controlled by the first processor based on commands from the second processor.

21 Claims, 20 Drawing Sheets

(51) Int. Cl.
  *F01D 21/00* (2006.01)
  *F01D 21/14* (2006.01)
  *F02C 9/20* (2006.01)
  *H04B 10/25* (2013.01)

(52) U.S. Cl.
  CPC .... *F05D 2220/323* (2013.01); *F05D 2270/09* (2013.01); *F05D 2270/44* (2013.01); *F05D 2270/54* (2013.01); *H04B 10/25* (2013.01)

(58) Field of Classification Search
  CPC ........... F05D 2220/323; F05D 2270/44; H04B 10/25
  See application file for complete search history.

(56) References Cited

U.S. PATENT DOCUMENTS

| | | | |
|---|---|---|---|
| 6,850,807 B2 | 2/2005 | Tahira | |
| 6,922,625 B2 | 7/2005 | Weir et al. | |
| 8,036,805 B2 | 10/2011 | Mahoney et al. | |
| 8,295,995 B2 | 10/2012 | Poisson | |
| 8,744,634 B2 | 6/2014 | Purani et al. | |
| 9,388,744 B2 | 7/2016 | Mathews, Jr. et al. | |
| 9,459,685 B1 | 10/2016 | Flikkema | |
| 2002/0059467 A1 | 5/2002 | Rapp et al. | |
| 2006/0075934 A1 | 4/2006 | Ram | |
| 2009/0312892 A1 | 12/2009 | Mahoney et al. | |
| 2010/0274416 A1 | 10/2010 | Poisson | |
| 2013/0255220 A1 | 10/2013 | Mathews | |
| 2015/0355946 A1 | 12/2015 | Kang | |
| 2016/0373837 A1* | 12/2016 | Sobanski | G07C 5/008 |
| 2017/0254216 A1* | 9/2017 | Adibhatla | F01D 21/003 |
| 2018/0362190 A1 | 12/2018 | Chambers et al. | |
| 2020/0047902 A1 | 2/2020 | Bingham et al. | |
| 2020/0047903 A1 | 2/2020 | Bingham et al. | |
| 2020/0047904 A1 | 2/2020 | Bingham et al. | |
| 2020/0047905 A1 | 2/2020 | Bingham et al. | |

FOREIGN PATENT DOCUMENTS

| | | | |
|---|---|---|---|
| EP | 2644869 A3 | 10/2013 | |
| JP | H05313734 | 11/1993 | |

OTHER PUBLICATIONS

Tooley et al., "Design and System Implementation Considerations for High-Temperature Distributed Engine Control," American Institute of Aeronautics and Astronautics, Inc., Proceedings of the 46th AIAA/ASME/SAE/ASEE Joint Propulsion Conference & Exhibit in Nashville, TN, Jul. 25-28, 2010, 23 pp.

Merrill et al., "Distributed Engine Control Design Considerations," American Institute of Aeronautics and Astronautics, Inc., Proceedings of the 46th AIAA/ASME/SAE/ASEE Joint Propulsion Conference & Exhibit in Nashville, TN, Jul. 25-28, 2010, 14 pp.

European Search Report, dated Dec. 4, 2019, in EP Application No. 19185173.0.

Response to Office Action dated Dec. 2, 2019, from U.S. Appl. No. 16/057,526, filed Mar. 2, 2020, 8 pp.

Office Action from U.S. Appl. No. 16/057,529, dated Mar. 3, 2020, 13 pp.

Notice of Allowance from U.S. Appl. No. 16/057,526, dated Mar. 19, 2020, 9 pp.

Notice of Allowance from U.S. Appl. No. 16/057,535, dated Mar. 4, 2020, 11 pp.

Response to Office Action from U.S. Appl. No. 16/057,529 dated Mar. 3, 2020, filed Jun. 3, 2020, 8 pgs.

Response to Final Office Action from U.S. Appl. No. 16/057,529 dated Jul. 16, 2020, filed Sep. 16, 2020, 10 pgs.

Final Office Action from U.S. Appl. No. 16/057,529 dated Jul. 16, 2020, 24 pgs.

Notice of Allowance from U.S. Appl. No. 16/057,526 dated Jul. 14, 2020, 14 pgs.

Response to Extended European Search Report from counterpart EP Application No. 19185173.2 dated Dec. 4, 2019, filed Jul. 21, 2020, 65 pgs.

Advisory Action from U.S. Appl. No. 16/057,529 dated Sep. 24, 2020, 7 pgs.

Notice of Allowance from U.S. Appl. No. 16/057,526, dated Oct. 29, 2020, 7 pp.

Notice of Allowance from U.S. Appl. No. 16/057,529, dated Oct. 30, 2020, 11 pp.

Communication pursuant to Article 94(3) EPC from counterpart EP Application No. 19185173.2 dated Apr. 22, 2021, 6 pgs.

* cited by examiner

DISTRIBUTED CONTROL AND MONITORING SYSTEM FOR MULTIPLE PLATFORMS

CROSS-REFERENCE TO RELATED APPLICATIONS

This application is related to concurrently filed U.S. patent application Ser. No. 16/057,526, entitled "Distributed Control and Monitoring System for Multiple Platforms," filed Aug. 7, 2018, inventors: Nathan Bingham, Michael T. Elliott, James McPherson, Chris Ruff, Andrew Terbrock and Kerry Wiegand; U.S. patent application Ser. No. 16/057,529, entitled "Distributed Control and Monitoring System for Multiple Platforms," filed Aug. 7, 2018, inventors: Nathan Bingham, Michael T. Elliott, James McPherson, Chris Ruff, Andrew Terbrock and Kerry Wiegand; U.S. patent application Ser. No. 16/057,535, entitled "Distributed Control and Monitoring System for Multiple Platforms," filed Aug. 7, 2018, inventors: Nathan Bingham, Michael T. Elliott, James McPherson, Chris Ruff, Andrew Terbrock and Kerry Wiegand; U.S. patent application Ser. No. 16/057,546, entitled "A Method of Improved Cyber Security with Frequency Separation," filed Aug. 7, 2018, inventors: John Joseph Costello and Richard J. Skertic; and U.S. patent application Ser. No. 16/057,554, entitled "A Method and Process of Cyber Security Via Software Imaging," filed Aug. 7, 2018, inventors: John Joseph Costello and Richard J. Skertic. The entirety of these applications are herein incorporated by reference.

BACKGROUND

Control systems, such as engine control systems, are tightly integrated with other components that provide or receive data. The control systems are linked to these other components by way of multiple input/output ("I/O") data connections through which the data travels. The multiple I/O data connections constrain the control systems. For example, the various interconnected components must be physically located close to each other to minimize the connection lengths of the multiple I/O data connections, such as harness lengths for harnesses that carry the multiple I/O data connections. As such, these control systems are often designed in a bespoke manner, such that they are highly customized for specific purposes.

In addition, control systems must handle high data throughput rates, and future control systems may be required to handle even higher throughput rates. For example, the processing power required for the control of complex platforms that will handle the future data throughput requirements, such as an turbine engine, may not be available, at least in hardened form (i.e., able to withstand the harsh operating environment associated with gas turbines). In addition, currently available processors become obsolete quickly and thus require costly redesign of the control system. Moreover, entities, such as regulatory entities, are requiring control systems to provide cyber security. For example, military contracts may require control systems to be protected against cyber threats. As such, there are opportunities to improve control systems.

SUMMARY

Embodiments of the disclosed subject matter include a distributed control system for a gas turbine engine, wherein during operation a benign environment is associated with at least one location and a harsh environment is associated with at least another location. The gas turbine engine including: an input/output (I/O) module attached to the gas turbine engine. The input/output module having a first processor; a first network interface device operably coupled to the first processor; at least one sensor operably coupled to the I/O module providing a signal to the first processor, the signal based on sensed conditions of the gas turbine engine; and at least one actuator operably coupled to the I/O module and controlled by the first processor. The gas turbine engine also including a computation module attached to the gas turbine engine, the computation module having: a second processor with higher processing power than the first processor; and a second network interface device operably coupled to the second processor, wherein the second network interface device and the first network interface device provide a communication network between the first processor and the second processor. The first processor is configured to execute gas turbine engine safety functions. The computation module is located in the benign environment and the I/O module is located in the harsh environment.

Another disclosed embodiment is an aircraft comprising an aircraft engine; and a control system. The control system comprising: a first processor located within the aircraft engine and operably coupled to a first network interface device; at least one sensor located within the aircraft engine that provides signals to the first processor based on sensed conditions of the gas turbine engine; and, at least one actuator located within the aircraft engine and configured to be controlled by the first processor. The control system further includes a second processor located within the aircraft engine that has higher processing power than the first processor; and a second network interface device located within the aircraft engine and operably coupled to the second processor, wherein the second network interface device and the first network interface device provide a communication network between the first processor and the second processor. The second processor is operable to receive sensor readings of the at least one sensor from the first processor based on the signals, and transmit commands to the first processor for controlling the at least one actuator. The first processor is configured to execute aircraft engine safety functions, wherein the second processor is located in an area of the gas turbine engine that provides a benign environment and the I/O module is located in an area of the gas turbine engine that provides a harsh environment during operation of the gas turbine engine.

Yet another embodiment is disclosed as a method for controlling a gas turbine engine, the gas turbine engine defining during operation a benign environment associated with at least one location and a harsh environment associated with at least another location. The method including receiving, by a first processor located within the harsh environment of the gas turbine engine from at least one sensor operably coupled to the first processor, sensor readings based on sensed conditions of the gas turbine engine; and transmitting, by the first processor to a second processor located within the benign environment of the gas turbine engine, sensor data based on the received sensor readings, wherein the second processor has higher processing power than the first processor. The method also includes transmitting, by the second processor to the first processor, actuator commands to control at least one actuator operably coupled to first processor; controlling, by the first processor, the at least one actuator based on the actuator commands; and executing, by the first processor, gas turbine engine safety functions.

BRIEF DESCRIPTION OF THE DRAWINGS

The following will be apparent from elements of the figures, which are provided for illustrative purposes.

Figure 1:
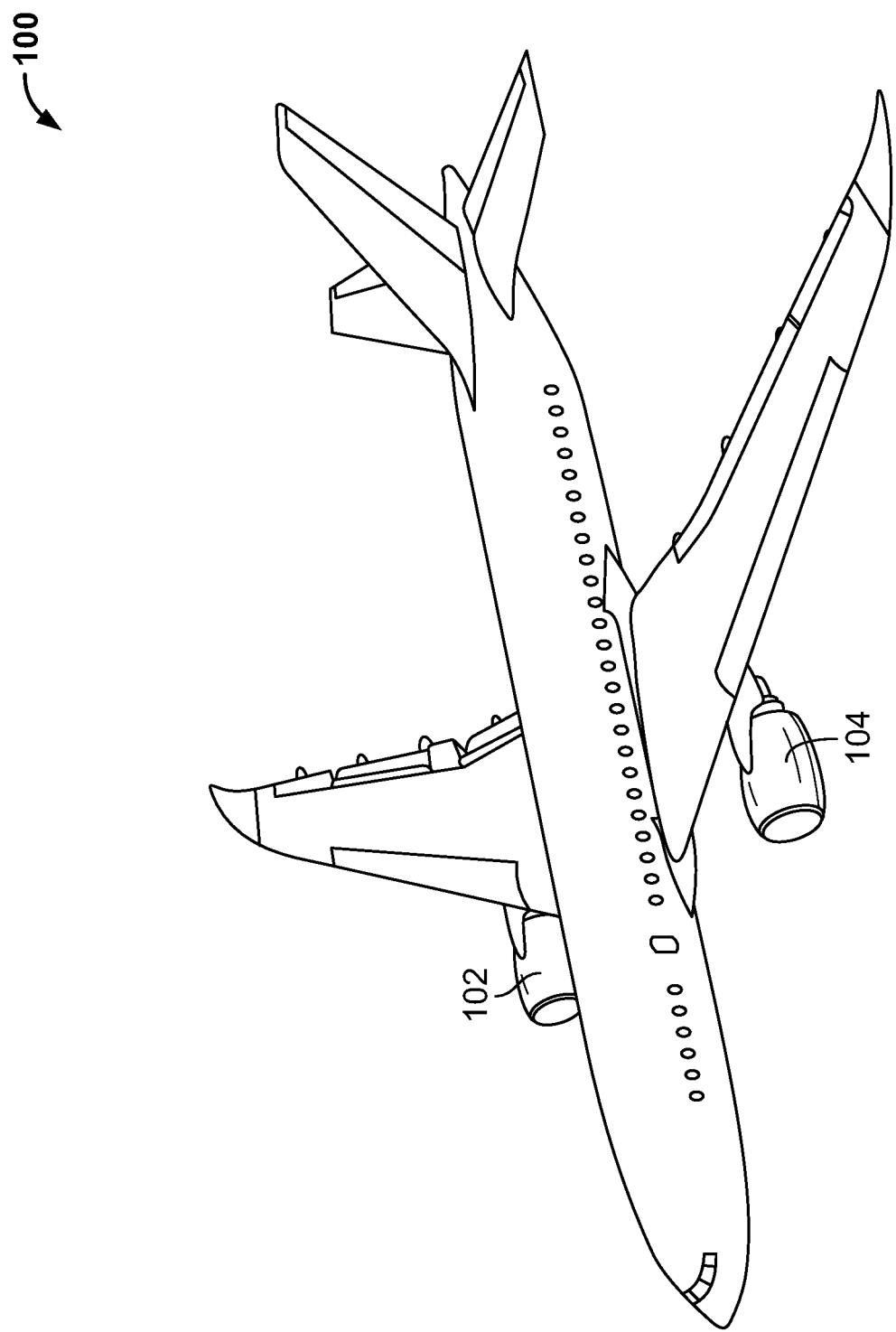
FIG. 1 is an illustration of an aircraft with engines employing an engine control system in accordance with some embodiments.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments in the drawings and specific language will be used to describe the same.

FIG. 1 illustrates an example aircraft 100 with turbine engines 102, 104. Each turbine engine may be controlled by an engine control system, which is discussed in more detail with respect to FIG. 2.

Figure 2A:
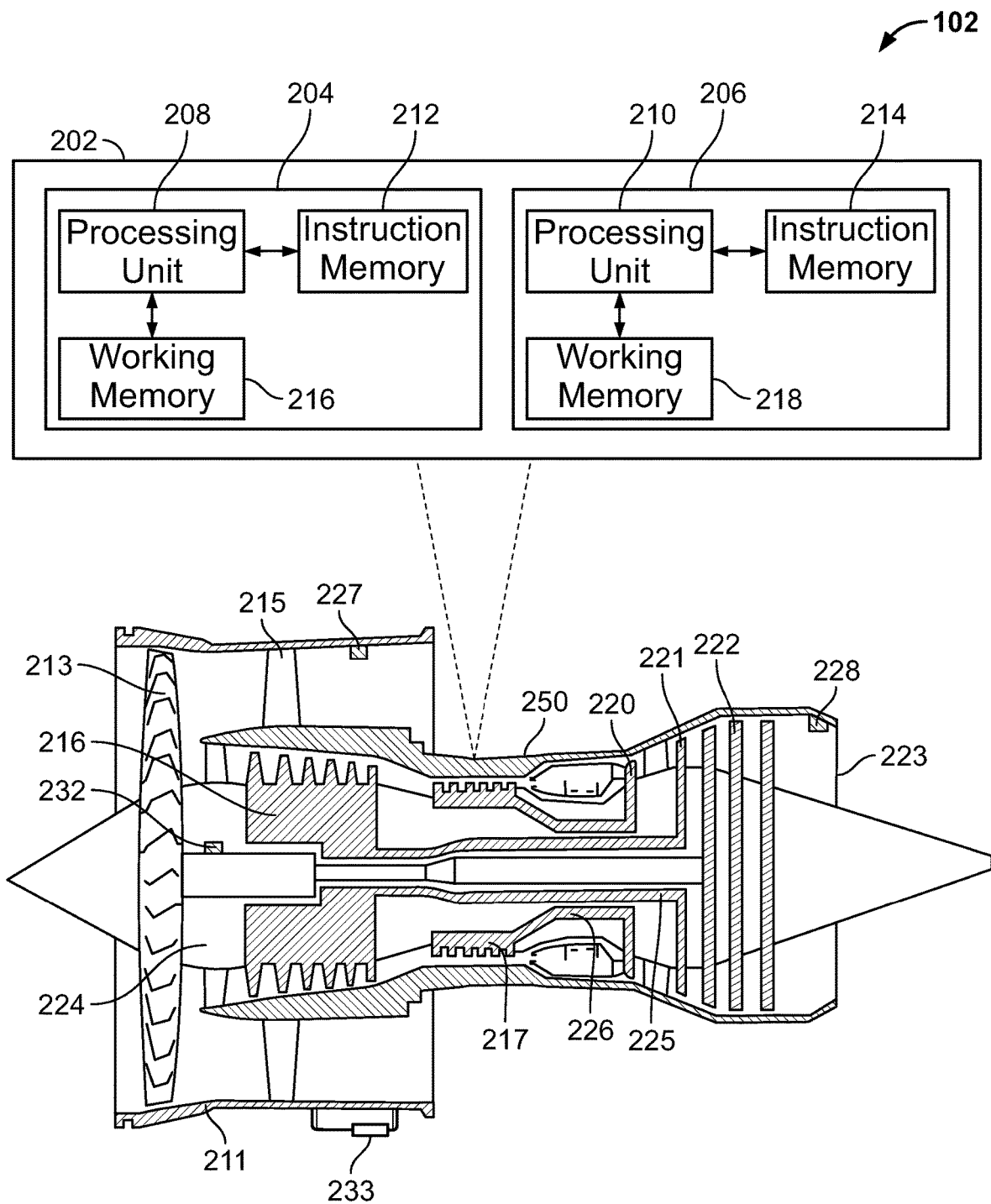
FIG. 2A is an illustration of an aircraft engine employing an engine control system in accordance with some embodiments.

FIG. 2A illustrates the aircraft engine 102 of the example aircraft 100 of FIG. 1 in more detail. The aircraft engine 102 includes an engine control system 202 with a distributable architecture design. As indicated in the figure, the engine control system 202 includes a computation module (CM) 204 and an input/output (I/O) module 206. Each of the computation module 204 and I/O module 206 includes electronic circuitry. The electronic circuitry may include one or more processing units 208, 210. Each of processing units 208, 210 can be, for example, a microprocessor, an execution unit or "core" on a microprocessor chip, a digital signal processor (DSP), a soft or hard core within a field-programmable gate arrays (FPGA), a processor within an application-specific integrated circuit (ASIC), a general processing unit (GPU), a commercial off the shelf (COTS) processor, or any other suitable processor.

Each of the computation module 204 and I/O module 206 may include instruction memory 212, 214, respectively. Instruction memory 212, 214 can store instructions that can be accessed (e.g., read) and executed by processing units 208, 210, respectively. For example, each of instruction memory 212, 214 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Each of the computation module 204 and I/O module 206 may also include working memory 216, 218, respectively. Processing units 208, 210 can store data to, and read data from, working memory 216, 218, respectively. For example, processing units 208, 210 can store a working set of instructions to working memory 216, 218, such as instructions loaded from instruction memory 212, 214, respectively. Processing units 208, 210 can also use working memory 208, 210, respectively, to store dynamic data.

As will discussed further below, each of the computation module 204 and the I/O module 206 are designed and configured to include the one or more processing units 208, 210 based on available locations on an engine platform, as well as on performance requirements of various control system functions. For example, while both the computation module 204 and the I/O module 206 may be located on engine platform 250, the computation module 204 may be located on or near a part of the engine platform that is subject to a more benign operating environment (proximate the cold components, e.g. inlet, fan, nacelle etc.) than the operating environment that the I/O module 206 is subject to, in general the hostility of the environment increases with proximity to the hot components (e.g. combustors, turbines, nozzle, etc.). of the engine Each of the computation module 204 and the I/O module 206 may be assigned processing tasks in accordance with the available processing power that is available at each of the respective module's operating conditions.

FIG. 2A further illustrates, as part of aircraft engine 102, a fan 213, a first compressor 216, a second compressor 217, turbines 220, 221, 222, propulsion nozzle 223, and fan duct 211. The fan duct 211 may be supported by guide vanes 215 extending from engine platform 250. The fan 213 is driven by a first shaft 224 connected to fan 213. First compressor 216 is driven by turbine 221 via a second shaft 225, and second compressor 217 is driven by turbine 220 via a third shaft 226. Engine control system 202 may also be communicatively coupled to one or more engine control devices 227, 228, 232, 233 such as sensors (e.g., pressure or speed transducer) or actuators. An example of an actuator is shown as 233 which controls the orientation of guide vane 215.

Figure 2B:
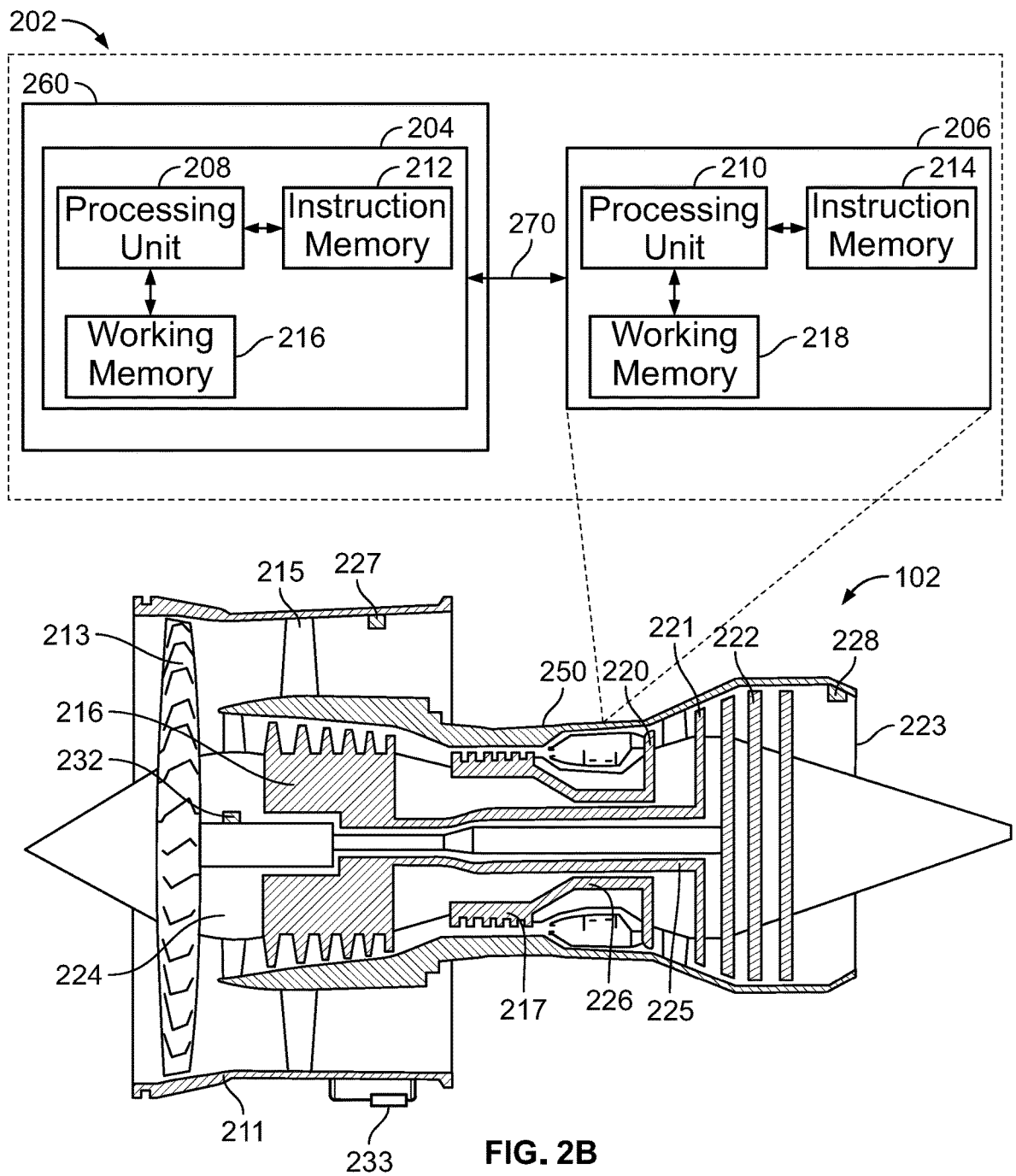
FIG. 2B is another illustration of an aircraft engine employing an engine control system in accordance with some embodiments.

FIG. 2B illustrates another example of an engine control system 202 that includes a computation module 204 and I/O module 206. However, in this example, while I/O module 206 is located on engine platform 250, computation module 204 is located on off-platform 260. Off-platform 260 may be, for example an area that is not located on aircraft engine 102. For example off-platform 260 may be a platform that includes third-party equipment such as a customer platform.

Figure 3A:
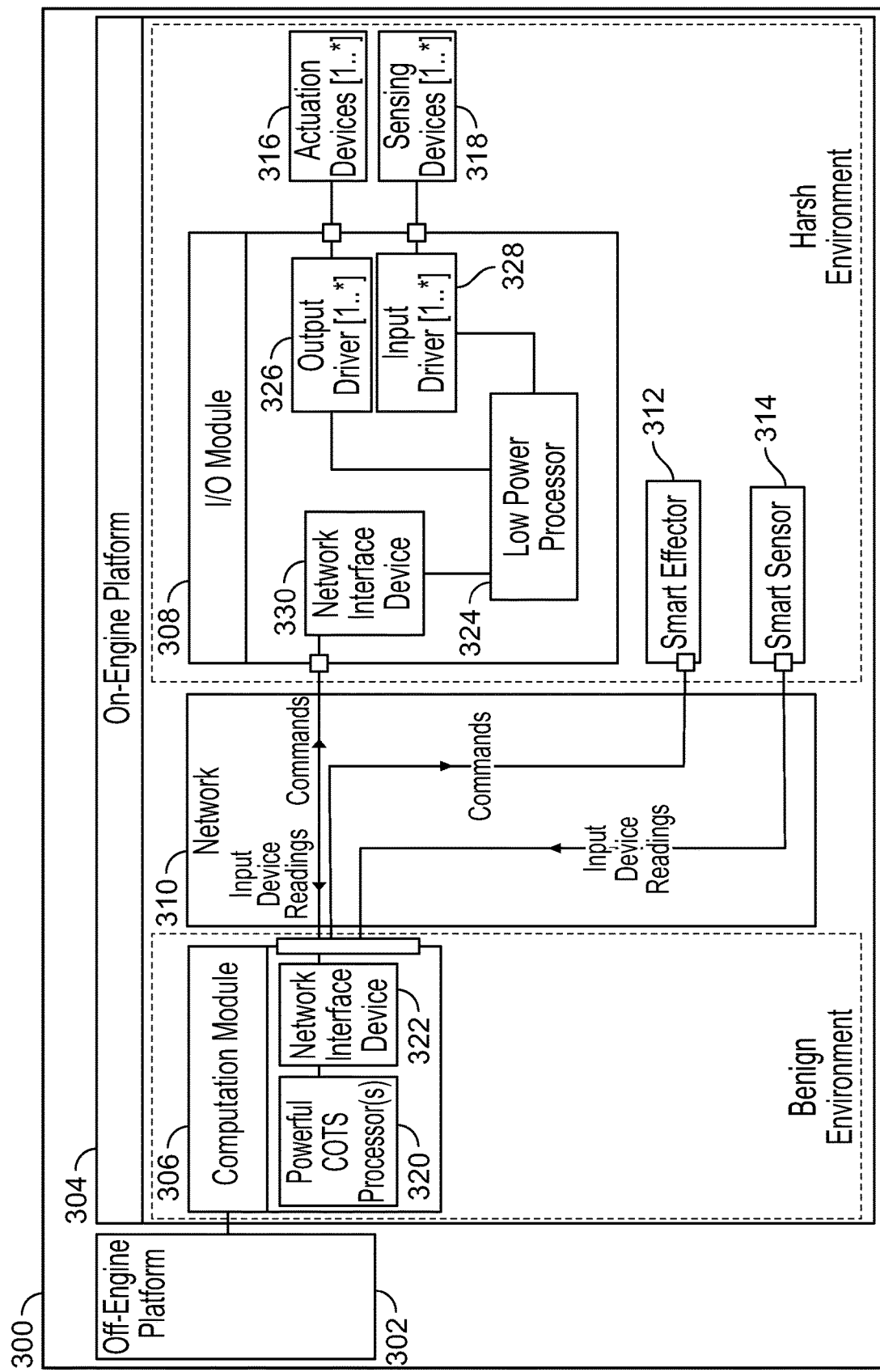
FIG. 3A is a block diagram of an engine control system in accordance with some embodiments.

FIG. 3A illustrates a block diagram of an engine control system 300 that includes an off-engine platform 302 operably coupled to an on-engine platform 304. On-engine platform 304 includes computation module 306, I/O module 308, smart effector 312, smart sensor 314, one or more actuation devices 316, one or more sensing devices 318, and network 310. In this example, computation module 306 includes one or more powerful commercial-off-the-shelf (COTS) processors 320 and a network interface device 322. Network interface device 322 provides a communication interface between one or more powerful COTS processors 320 and network 310.

I/O module 308 includes one or more low power processors 324, one or more output drivers 326, one or more input drivers 328, and a network interface device 330. In some examples, I/O module 308 includes just one low power processor 324. Network interface device 330 provides a communication interface between one or more low power processors 324 and network 310. In addition, one or more low power processors 324 are operatively coupled to one or more output drivers 326, which may allow for the control of one or more actuation devices 316, for example. Similarly, one or more low power processors 324 are operatively coupled to one or more input drivers 328, which may allow for the reception of data from one or more sensors 318, for example.

Network 310 allows for communication between computation module 306, I/O module 308, smart effector 312, and smart sensor 314. For example, one or more low power processors 324 may send data (e.g., device readings) from one or more sensing devices 318 to one or more powerful COTS processors 320 via network 310. Similarly, one or more powerful COTS processors 320 may send commands to one or more low power processors 324 for the control of the one or more actuation devices 316. One or more powerful COTS processors 320 may also send commands to smart effector 312 and receive data (e.g., device readings) from smart sensor 314 via network 310. Network 310 may be any suitable network, such as any suitable hardwired network or wireless network. The hardwired network can be, for example, a fiber optic network, an Ethernet network, or any other suitable hardwired network.

Off-engine platform 302 may include hardware and/or software that allows for communication with the on-engine platform 304. In this example, computation module 306 is operably coupled to off-engine platform 302. For example, computation module 306 may send and receive messages to and from off-engine platform 302.

The location on the engine itself may be subject to widely different environments. For example, gas turbines have relatively cool areas (e.g. inlet, compressor) and hot areas (e.g. combustion chamber, turbines, exhaust). The proximity to the cool and hot areas also provides further gradation of the environment between a relative benign environment and a relatively harsh environment. Vibrational loads and temperature gradients also may be a function of the region of the engine. Harsh environments of below 40 degrees Celsius or over 125 degrees Celsius may typically preclude the use of COTS processors. In addition, COTS processors may be more susceptible to high-energy particles from space, such as what may be experienced by an airplane when flying at high altitudes.

Hence, as indicated in the illustration, the operating environment experienced by I/O module 308 may be harsh compared to the operating environment experienced by computation module 306. For example, I/O module 308 may experience more heat and thus hotter temperatures during operation of the engine than that experienced by computation module 306. Because these hotter temperatures may be higher than what a COTS processor is designed to operate in (e.g., 0° Celsius (C) to 85° C.), a COTS processor would be unavailable for placement on I/O module 308. In some examples, I/O module 308 may experience colder temperatures during operation of the engine than that experienced by computation module 306, where the colder temperatures may be lower than what a COTS processor is designed to operate in. As such a COTS processor would be unavailable for placement on I/O module 308 in this example as well.

Figure 3B:
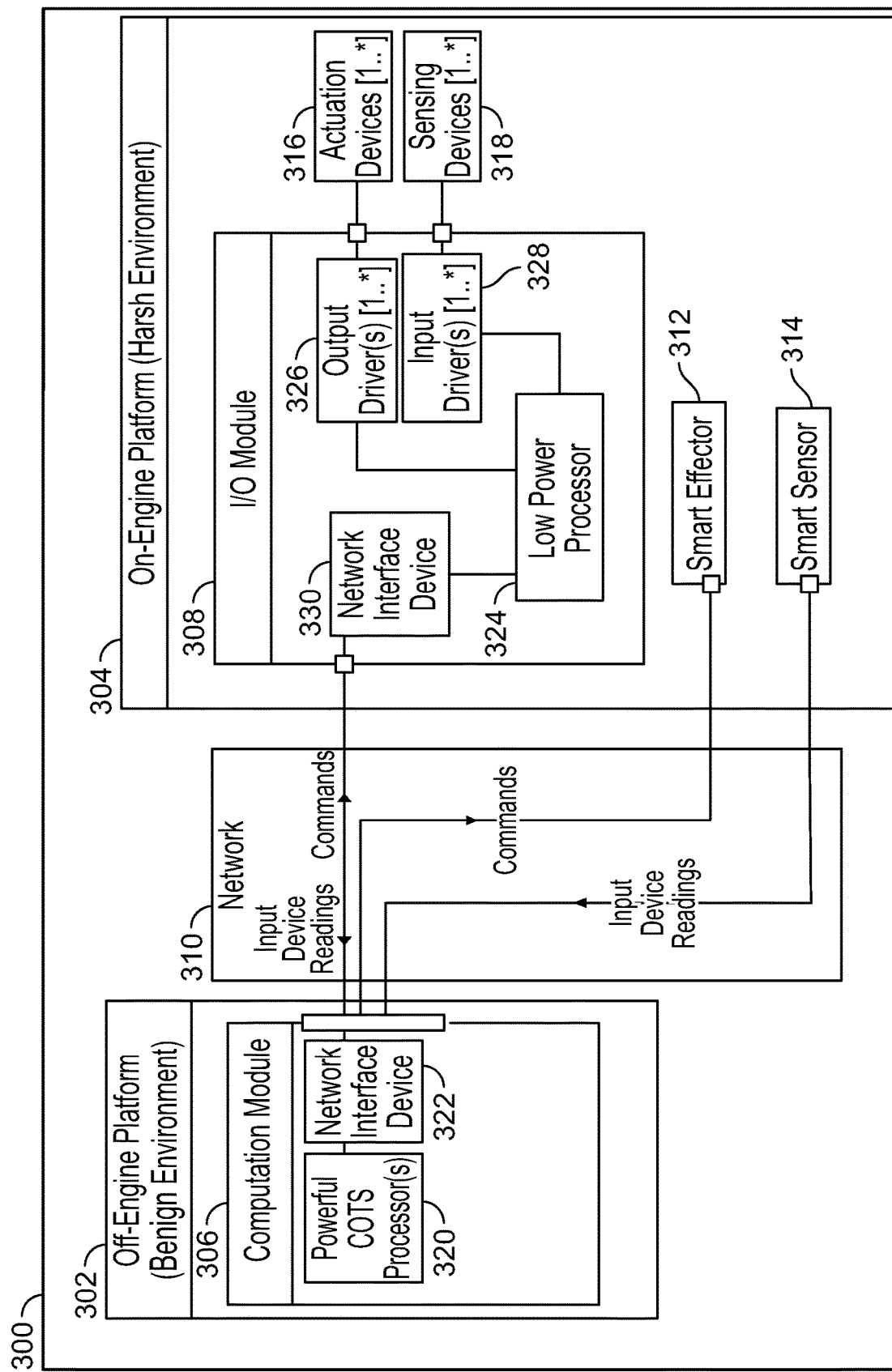
FIG. 3B is another block diagram of an engine control system in accordance with some embodiments

FIG. 3B illustrates another block diagram of an engine control system 300 that includes an off-engine platform 302 operably coupled to an on-engine platform 304. While off-engine platform 302 includes computation module 306, on-engine platform 304 includes I/O module 308, smart effector 312, smart sensor 314, one or more actuation devices 316, and one or more sensing devices 318. In this example, computation module 306 includes one or more powerful COTS processors 320 and a network interface device 322. Network interface device 322 provides a communication interface between one or more powerful COTS processors 320 and network 310.

I/O module 308 includes one or more low power processors 324, one or more output drivers 326, one or more input drivers 328, and a network interface device 330. In this example, I/O module 308 includes just one low power processor 324. Network interface device 330 provides a communication interface between low power processor 324 and network 310. In addition, low power processor 324 is operatively coupled to one or more output drivers 326, which may allow for the control of one or more actuation devices 316, for example. Similarly, low power processor 324 is operatively coupled to one or more input drivers 328, which allow for the reception of data from one or more sensors 318, for example.

Network 310 allows for communication between computation module 306, I/O module 308, smart effector 312, and smart sensor 314. For example, low power processor 324 may send data (e.g., device readings) from one or more sensing devices 318 to one or more powerful COTS processors 320 via network 310. Similarly, one or more powerful COTS processors 320 may send commands to one or more low power processors 324 for the control of the one or more actuation devices 316. One or more powerful COTS processors 320 may also send commands to smart effector 312 and receive data (e.g., device readings) from smart sensor 314 via network 310. Network 310 may be any suitable network.

As indicated in the illustration, the operating environment experienced by on-engine platform 304 is harsh compared to the operating environment experienced by off-engine platform 302. For example, on-engine platform 304 may experience more heat and thus hotter temperatures during operation of the engine than that experienced by off-engine platform 302.

Furthermore, as indicated in the illustration, the operating environment experienced by on-engine platform 304 is harsh compared to the operating environment experienced by off-engine platform 302. For example, on-engine platform 304 may experience more heat and thus hotter temperatures during operation of the engine than that experienced by off-engine platform 302. Because these hotter temperatures may be higher than what a COTS processor is designed to operate in (e.g., 0° Celsius (C) to 85° C.), a COTS processor would be unavailable for placement on on-engine platform 304. The on-engine platform 304 may also be subject to more dynamic vibratory loads than an off-engine platform 302.

Figure 4:
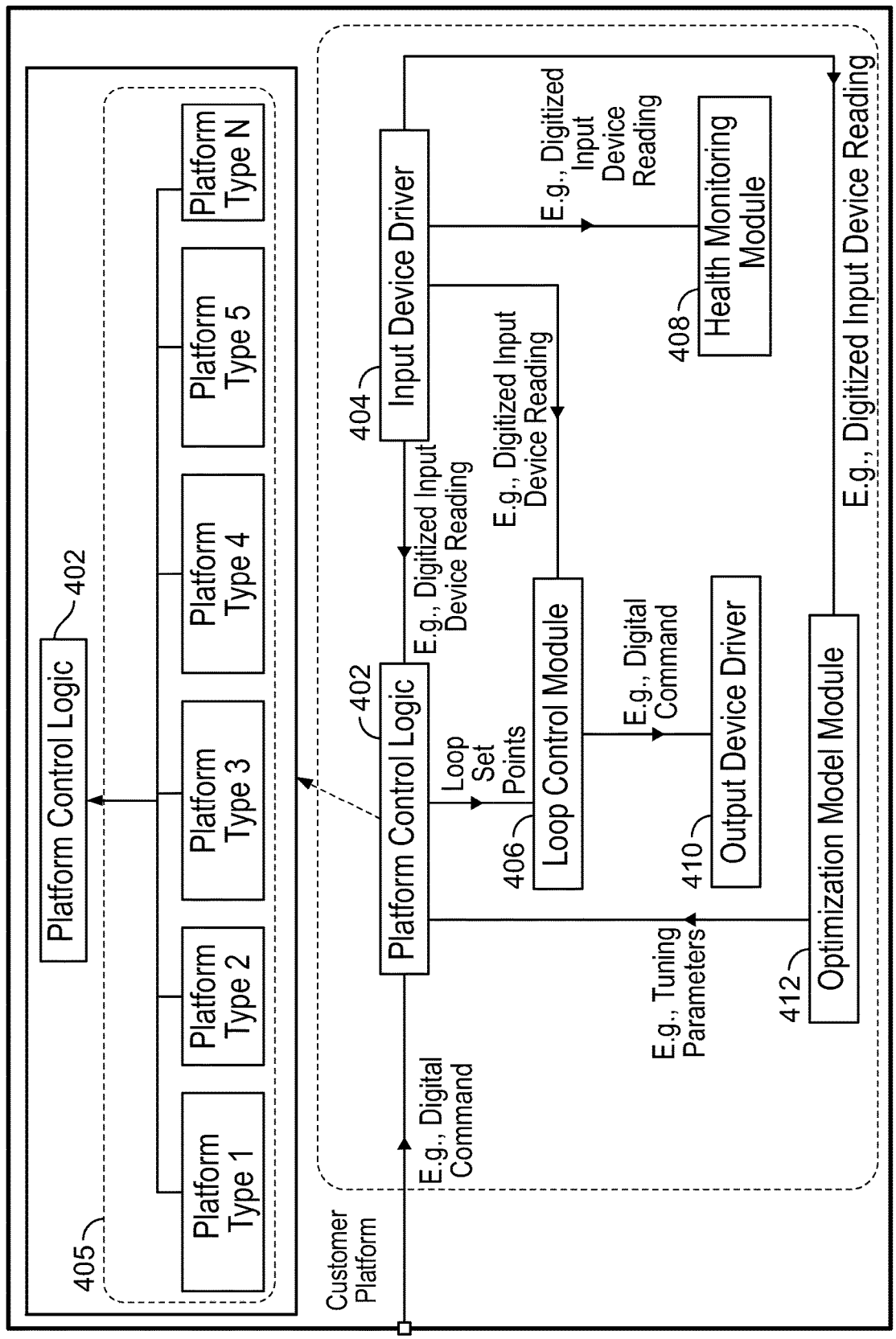
FIG. 4 is a block diagram of engine control functions that may be implemented by the engine control system of FIG. 3 in accordance with some embodiments.

FIG. 4 illustrates a block diagram of engine control functions that may be implemented by the engine control system 300 of FIG. 3. Specifically, platform control logic 402 describes engine control functions that may be carried out by one or more processors and software (e.g., executable instructions). For example the software, when executed by the one or more processors, may cause the one or more processors to perform one or more of the various engine control functions. For example, one or more powerful COTS processors 320 of computation module 306 of FIG. 3 may execute part or all of the functions of platform control logic 402. Similarly, one or more low power processors 324 of I/O module 308 of FIG. 3 may execute part or all of the functions of platform control logic 402.

Platform control logic 402 may be configured based on a specific platform or platform type to be controlled, such as one of platform types 405. As indicated in FIG. 4, platform control logic 402 may receive commands from a customer platform, such as off-engine platform 302 of FIG. 3. Platform control logic 402 may also receive device readings (e.g., data) from input device driver 404, which may be one or more of input devices drivers 328 of FIG. 3. In addition to providing device readings to platform control logic 402, input device driver 404 may provide device readings to health monitoring module 408, loop control module 406, and optimization model module 412. Each of health monitoring module 408, loop control module 406, and optimization model module 412 include software that, when executed by the one or more processors, cause the one or more processors to perform various system functions.

Health monitoring module 408 may provide for the monitoring of engine health conditions, such as current operating conditions. For example, health monitoring module 408 may determine the health of an engine based on the device readings received from input device driver 404.

In addition to device readings, loop control module 406 receives loop set points from platform control logic 402 and provides commands to output device driver 410. As such, loop control module 406 may control one or more devices that may interface to output device driver 410, such as, for example, one or more actuation devices 316 of FIG. 3.

Optimization model module 412 may receive device readings from input device driver 404 to determine tuning parameters to provide to platform control logic 402.

Platform control logic 402 may be modified based on the type of engine platform to be controlled. For example, one or more control functions associated with platform control logic 402 may be enabled or disabled based on the type of engine platform. The may include, for example, one or more control functions associated with health monitoring module 408, loop control module 406, and optimization model module 412. In addition, one or more these control functions may be modified based on the number or types of devices, such as sensors and actuators, that monitor and/or control an engine.

Figure 5:
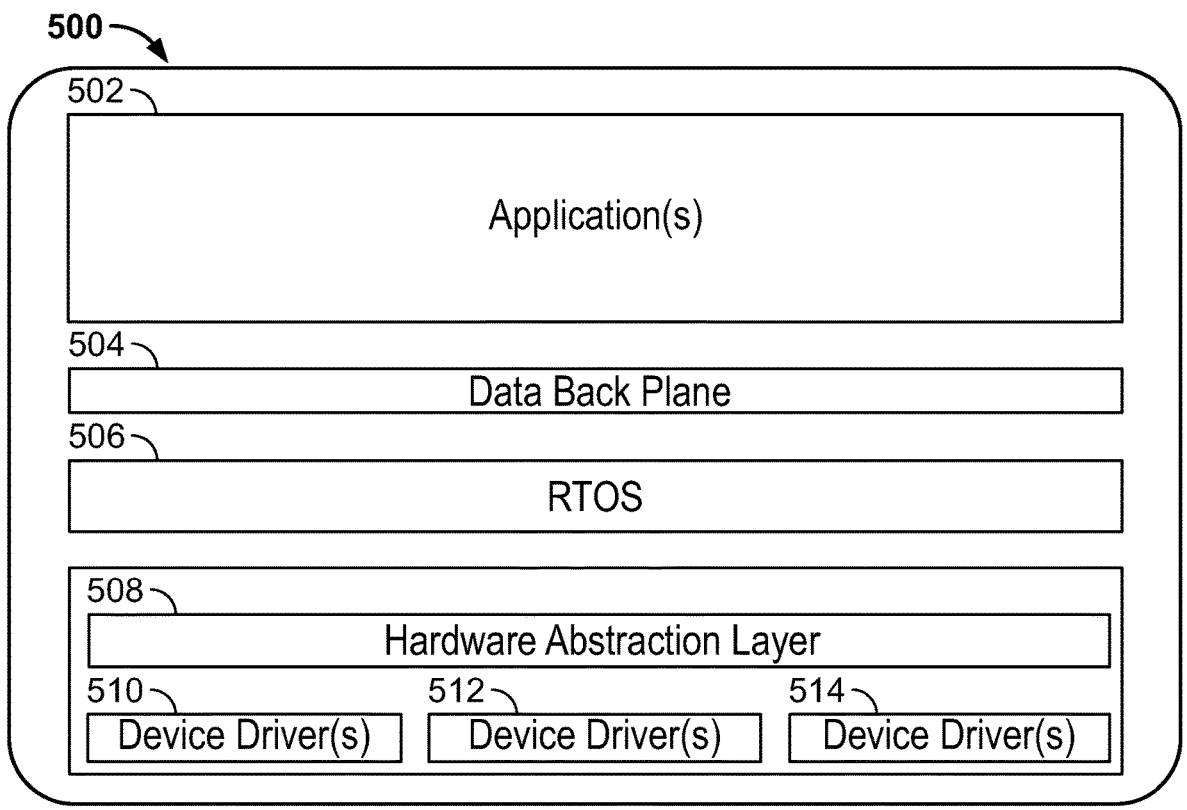
FIG. 5 is an example of a software architecture for the input/output (I/O) module of the engine control system of FIG. 3 in accordance with some embodiments.

FIG. 5 illustrates an example software architecture 500 for the I/O module 308 of the engine control system 300 of FIG. 3. Software architecture 500 may include application(s) ("App(s)") 502, data backplane 504, real-time operating system ("RTOS") 506, hardware abstraction layer ("HAL") 508, and one or more device drivers 510, 512, 514. Data backplane 504 allows for the communication of information (e.g., data, messages, etc.) between application(s) 502 on a same node or across nodes via RTOS 506. The HAL 508, which, in some examples, can be part of RTOS 506, allows the RTOS 506 to interact (e.g., communicate) with one or more device drivers 510, 512, 514. Each of device drivers 510, 512, 514 can allow communication with one or more devices, such as a network interface device, via a same, or different, communication protocol.

Figure 6:
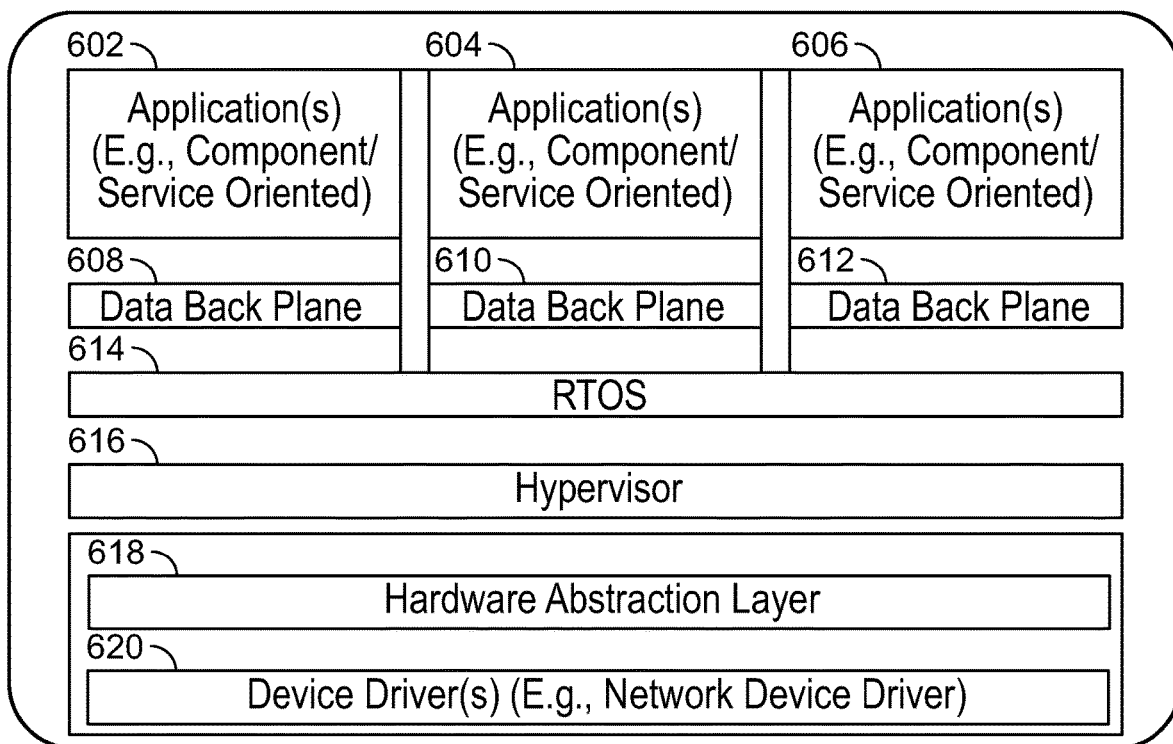
FIG. 6 is an example of a software architecture for the computation module of the engine control system of FIG. 3 in accordance with some embodiments.

FIG. 6 illustrates an example software architecture 600 for the computation module 306 of the engine control system 300 of FIG. 3. Software architecture 600 may include first application(s) 602, second application(s) 604, and third application(s) 606, each of which may be responsible for differing processing tasks. For example, each may include different component or service oriented applications.

Software architecture 600 may also include first data backplane 608, second data backplane 610, and third data backplane 612. Each of data backplanes 608, 610, 612 allow first application(s) 602, second application(s) 604, and third application(s) 606, respectively, to communicate with RTOS 614. Software architecture 600 may also include hypervisor 616, HAL 618, and one or more device drivers 620. Hypervisor 616 allows for the execution of one or more virtual machines, where each virtual machine may include a differing operating system, such as RTOS 614. HAL 618 allows for communication between hypervisor 616 and the one or more device drivers 620.

Figure 7:
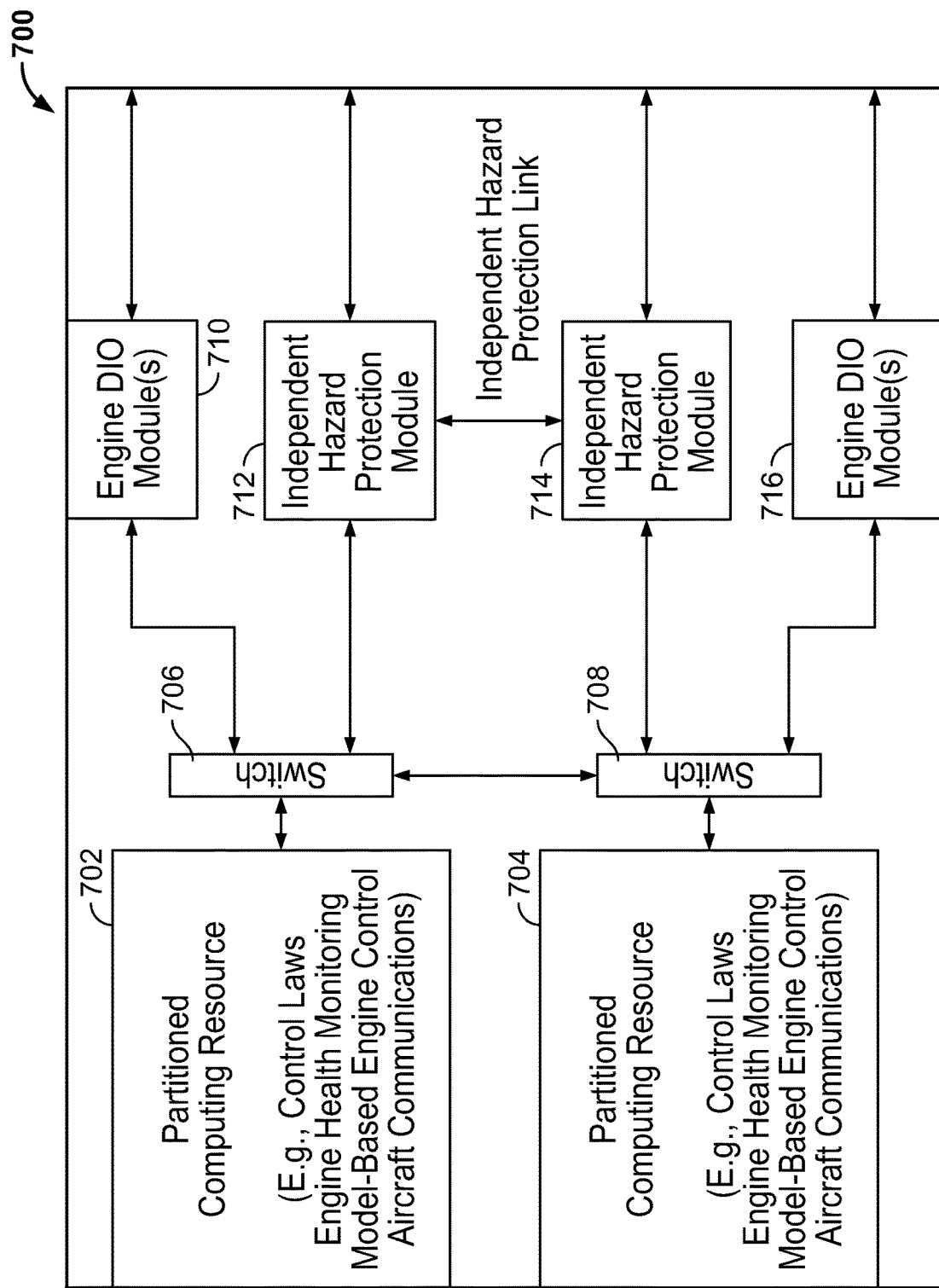
FIG. 7 is a block diagram of an electronics architecture for the engine control system of FIG. 3 in accordance with some embodiments.

FIG. 7 illustrates a block diagram of an example electronics architecture 700 for the engine control system of FIG. 3. Electronics architecture 700 includes at least two computing resources illustrated as partitioned computing resource 702 and partitioned computing resource 704. Partitioned computing resource 702 may be physically located in a different area than partitioned computing resource 704. For example, partitioned computing resource 702 may be the computation module 306 of FIG. 3, while partitioned computing resource 704 may be the I/O module 308 of FIG. 3.

Each partitioned computing resource 702, 704, as shown in FIG. 7 may be communicatively coupled to switches 706, 708, respectively. Switch 706 may also be communicatively coupled to engine (digital input/output ("DIO") module(s) 710 and to independent hazard protection module 712. Similarly, switch 708 is communicatively coupled to engine DIO module(s) 716 and to independent hazard protection module 714. Each engine DIO module 710, 716 and independent hazard protection module 712, 714 may be communicatively coupled with one or more sensor or actuator. The switches 706 and 708 may be part of or form a network between the partition computing resource 702, 704 and DIO module(s).

Switch 706 allows communication amongst partitioned computing resource 702, engine DIO module(s) 710, and independent hazard protection 712. Similarly, switch 708 allows communication amongst partitioned computing resource 704, engine digital input/output (DIO) module(s)

716, and independent hazard protection 714. In addition, switch 706 may communicate with switch 708 via a cross channel network link. Thus, for example, partitioned computing resource 702 may communicate with partitioned computing resource 704 via switches 706, 708, or a network. In some examples, independent hazard protection modules 712, 714 may communicate with each other over an independent hazard protection link or network.

Figure 8A:
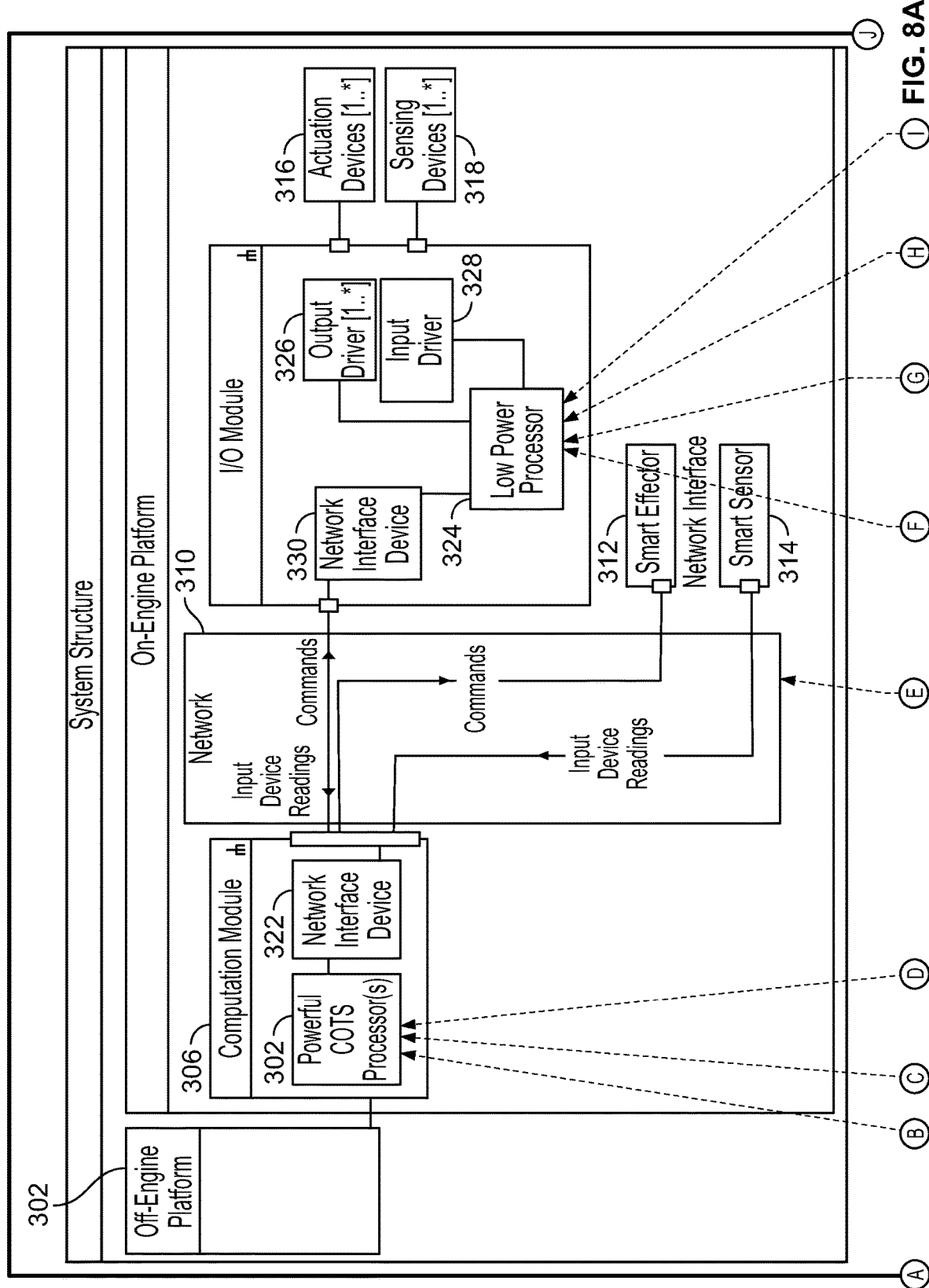
FIG. 8A is a block diagram of an allocation of system functions to the engine control system of FIG. 3A in accordance with some embodiments.
Figure 8A:
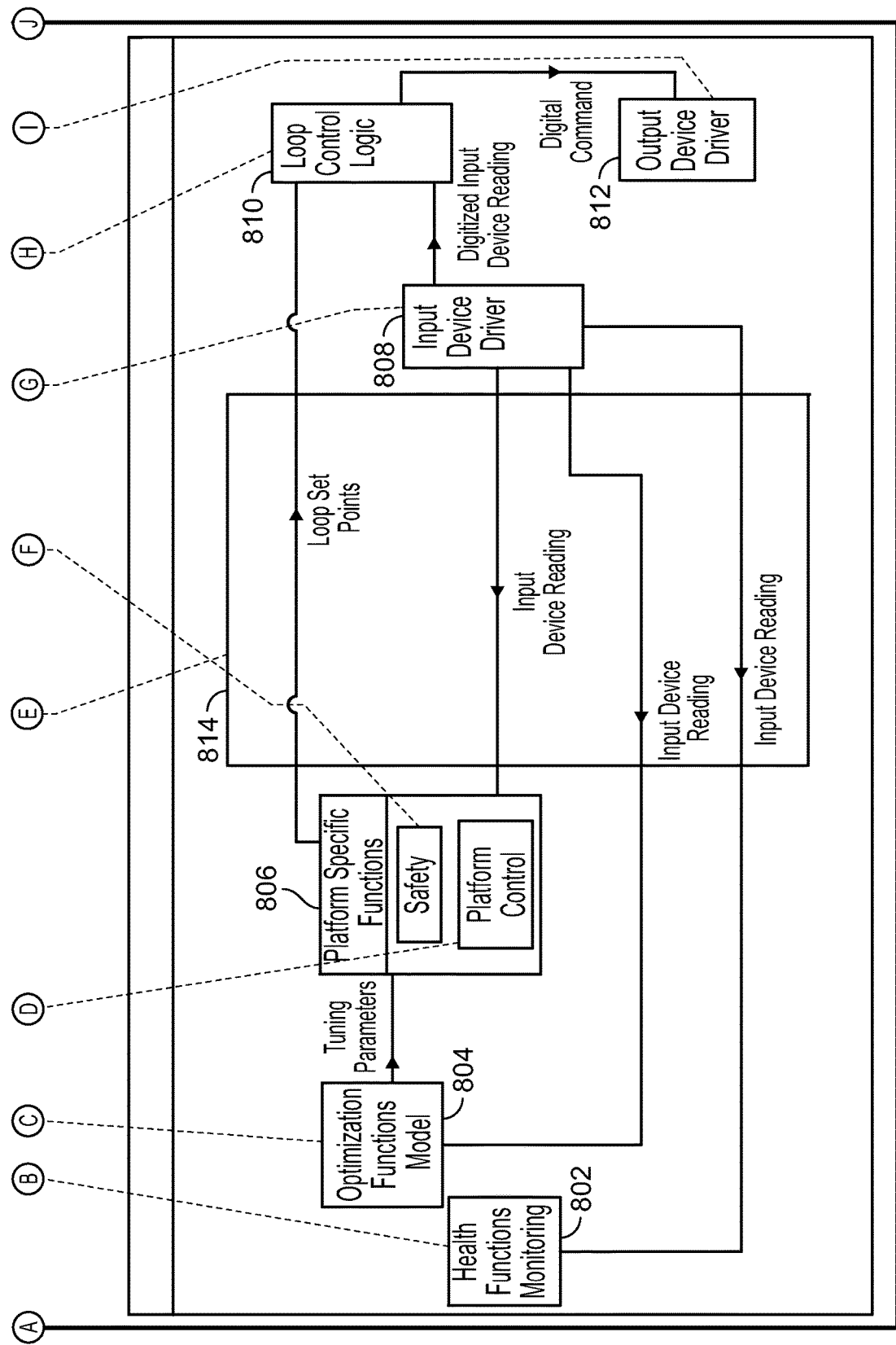

FIG. 8A is an illustration of a block diagram of the allocation (e.g., assignment) of system functions to the engine control system 300 of FIG. 3A. Specifically, the block diagram shows the allocation of system functions (e.g., via the assignment of software modules, such as those described with respect to FIG. 4) to the one or more powerful COTS processors 320 of computation module 306, and to the one or more low power processors 324 of I/O module 308.

As illustrated, health monitoring functions 802 and optimization model functions 804 are assigned to the one or more powerful COTS processors 320 of computation module 306. Input device driver 808, loop control functions 810, and output device driver 812 are assigned to the one or more low power processors 324 of I/O module 308. As for platform specific functions 806, the safety functions are assigned to the one or more low power processors 324 of I/O module 308, while the platform control functions are assigned to the one or more powerful COTS processors 320 of computation module 306.

As indicated by network traffic block 814, various system functions may communicate with each other via network 310. For example, health monitoring functions 802, which are assigned to and provided by the one or more powerful COTS processors 320 of computation module 306, may receive device readings over network 310 from input device driver 808, which is assigned to and is provided by the one or more low power processors 324 of I/O module 308. Similarly, optimization model functions 804 and the platform control functions of platform specific control functions 806, which are assigned to and provided by the one or more powerful COTS processors 320 of computation module 306, may also receive device readings over network 310 from input device driver 808. Loop control functions 810, which are assigned to the one or more powerful COTS processors 320 of computation module 306, may receive loop set points from the platform control functions over network 310.

As indicated in FIG. 3A, both computation module 306 and I/O module 308 are located on on-engine platform 304, which experiences a harsher environment than off-engine platform 302. In this example, by allocating engine protection functionality (e.g., safety functions) to the I/O module 308, a loss (e.g., inoperability) of network 310, or the loss of computation module 306, does not prevent the control system 300 from protecting the engine. Additionally, by locating the safety functions closer to the sensors and actuators, the latency for detecting and correcting or mitigating hazards is advantageously reduced in comparison to distributing the safety functions farther away.

Figure 8B:
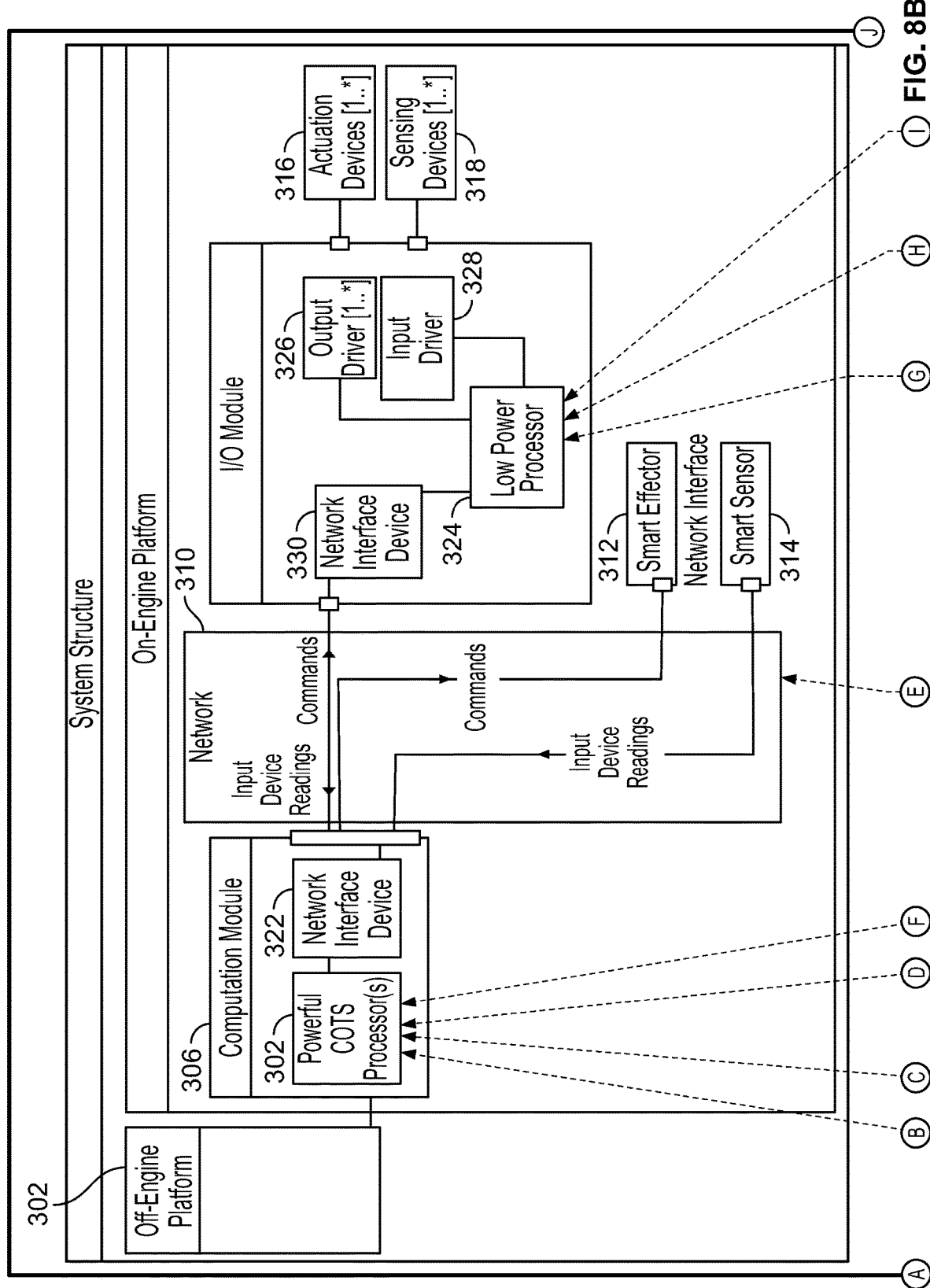
FIG. 8B is another block diagram of an allocation of system functions to the engine control system of FIG. 3A in accordance with some embodiments.
Figure 8B:
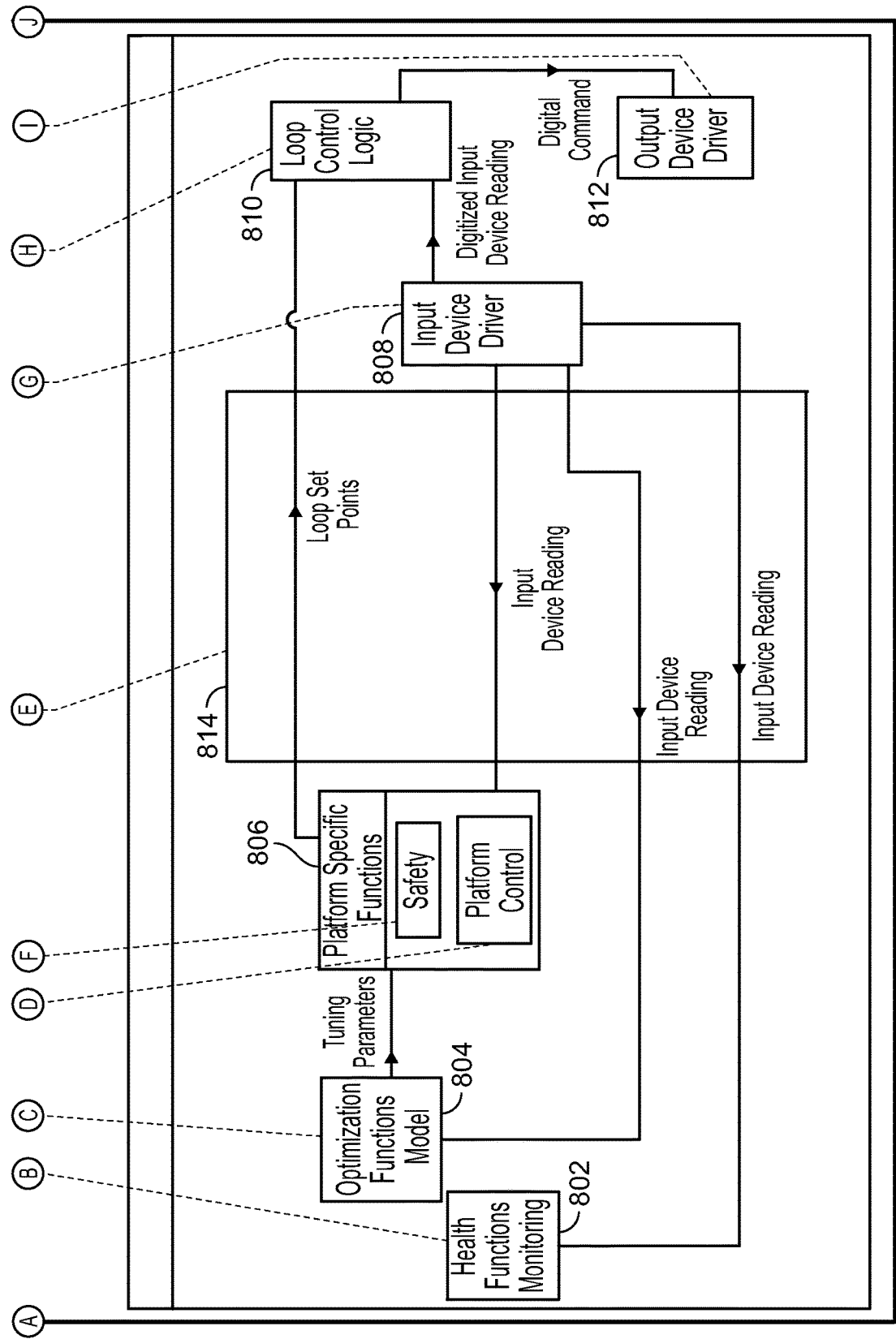

FIG. 8B illustrates another block diagram of the allocation (e.g., assignment) of system functions to the engine control system 300 of FIG. 3A. As illustrated, health monitoring functions 802 and optimization model functions 804 are assigned to the one or more powerful COTS processors 320 of computation module 306. Input device driver 808, loop control functions 810, and output device driver 812 are assigned to the one or more low power processors 324 of I/O module 308. Here, however, the platform specific functions 806 including the safety functions and the platform control functions are assigned to the one or more powerful COTS processors 320 of computation module 306. Because there is a reduction in processing power for processors that can meet the environmental conditions as well as space constraints on particular parts of an engine, more processing tasks are assigned to the one or more powerful COTS processors 320. For example, the computation module 306 may be placed within a fan case of the engine instead of the engine core.

Figure 8C:
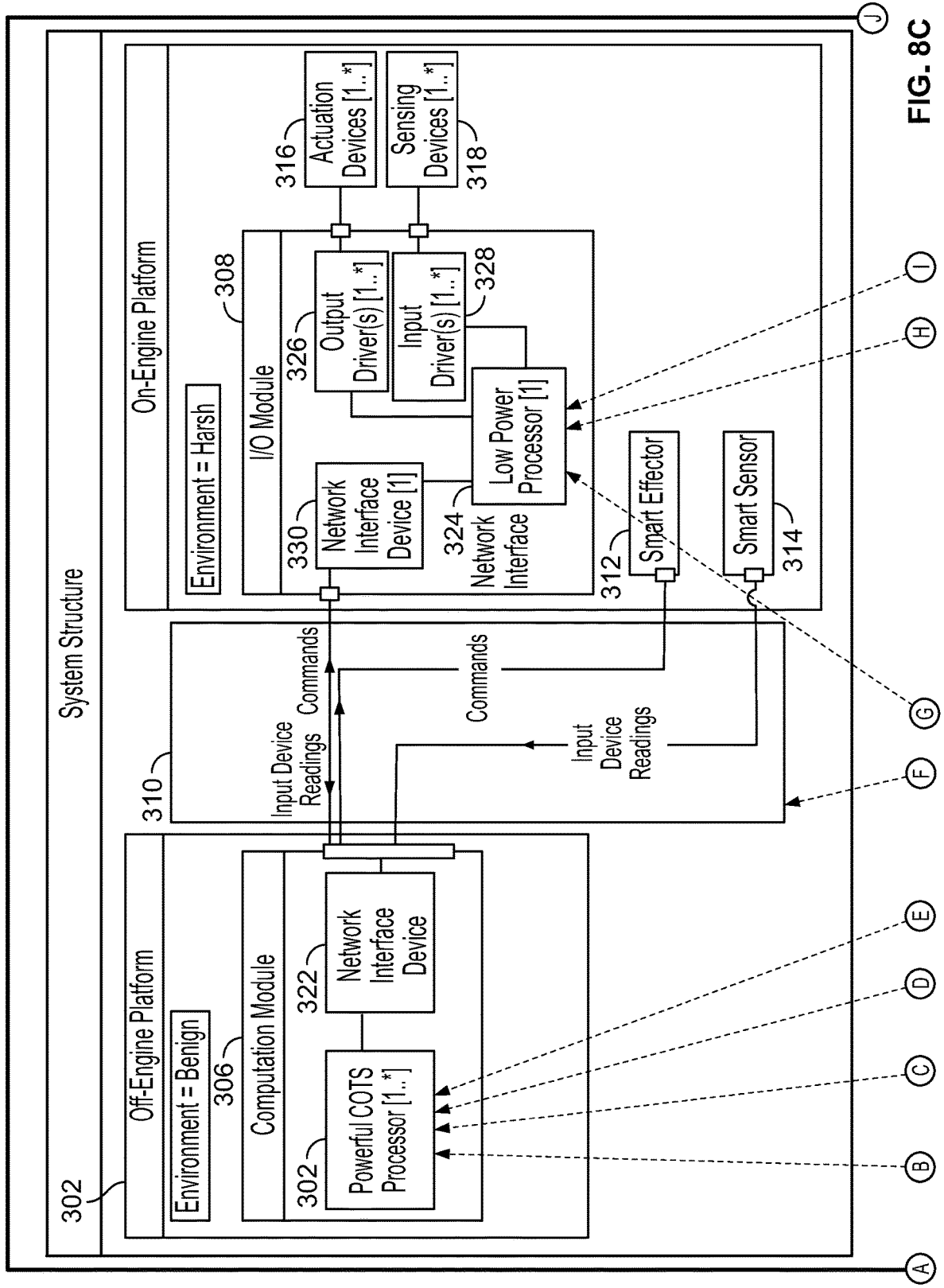
FIG. 8C is block diagram of an allocation of system functions to the engine control system of FIG. 3B in accordance with some embodiments.
Figure 8C:
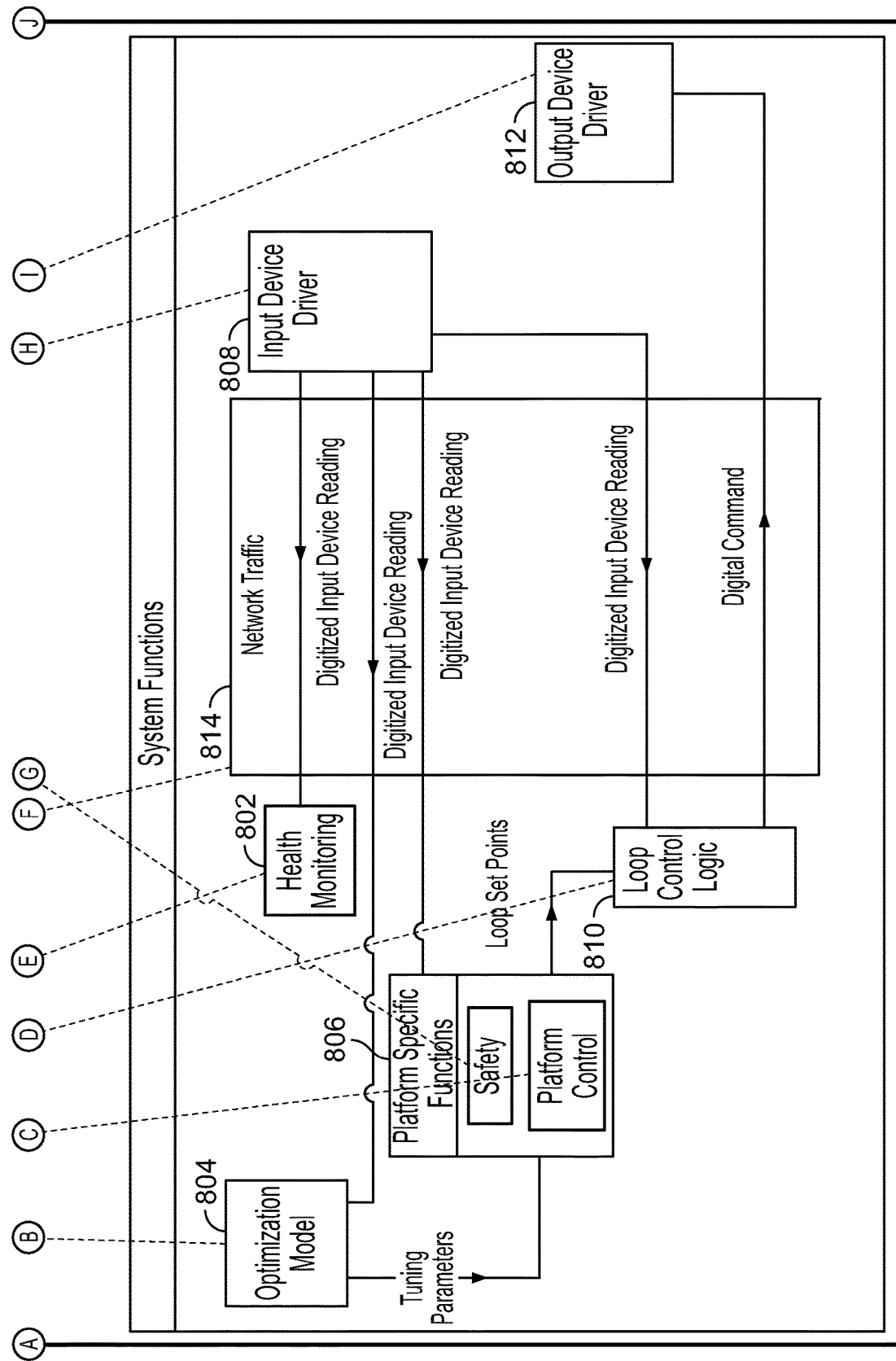

FIG. 8C is an illustration of a block diagram of the allocation (e.g., assignment) of system functions to the engine control system 300 of FIG. 3B. Specifically, the block diagram shows the allocation of system functions (e.g., via the assignment of software modules, such as those described with respect to FIG. 4) to the one or more powerful COTS processors 320 of computation module 306, and to the low power processor 324 of I/O module 308.

As illustrated, health monitoring functions 802, loop control functions 810, and optimization model functions 804 are assigned to the one or more powerful COTS processors 320 of computation module 306. Input device driver 808 and output device driver 812 are assigned to the low power processor 324 of I/O module 308. As for platform specific functions 806, the safety functions are assigned to the low power processor 324 of I/O module 308, while the platform control functions are assigned to the one or more powerful COTS processors 320 of computation module 306.

As indicated by network traffic block 814, various system functions may communicate with each other via network 310. For example, health monitoring functions 802, which are assigned to and provided by the one or more powerful COTS processors 320 of computation module 306, may receive device readings over network 310 from input device driver 808, which is assigned to and is provided by the one or more low power processors 324 of I/O module 308. Similarly, optimization model functions 804 and the platform control functions of platform specific control functions 806, which are assigned to and provided by the one or more powerful COTS processors 320 of computation module 306, may also receive device readings over network 310 from input device driver 808. Loop control functions 810, which are assigned to the one or more powerful COTS processors 320 of computation module 306, may receive loop set points from the platform control functions outside of network 310.

As indicated in FIG. 3B, I/O module 308 is located on on-engine platform 304, which experiences a harsher environment than off-engine platform 302, where computation module 306 is located. In this example, by allocating engine protection functionality (e.g., safety functions) to the I/O module 308, a loss (e.g., inoperability) of network 310, or the loss of computation module 306, does not prevent the control system 300 from protecting the engine. Moreover, processing requirements of the I/O module are such that, in some examples, they are executed by just one low power processor 324. For example, the processing requirements of the safety functions, one or more output drivers 326, and one or more input drivers 328 are less than what can be supported by just one low power processor 324.

Figure 8D:
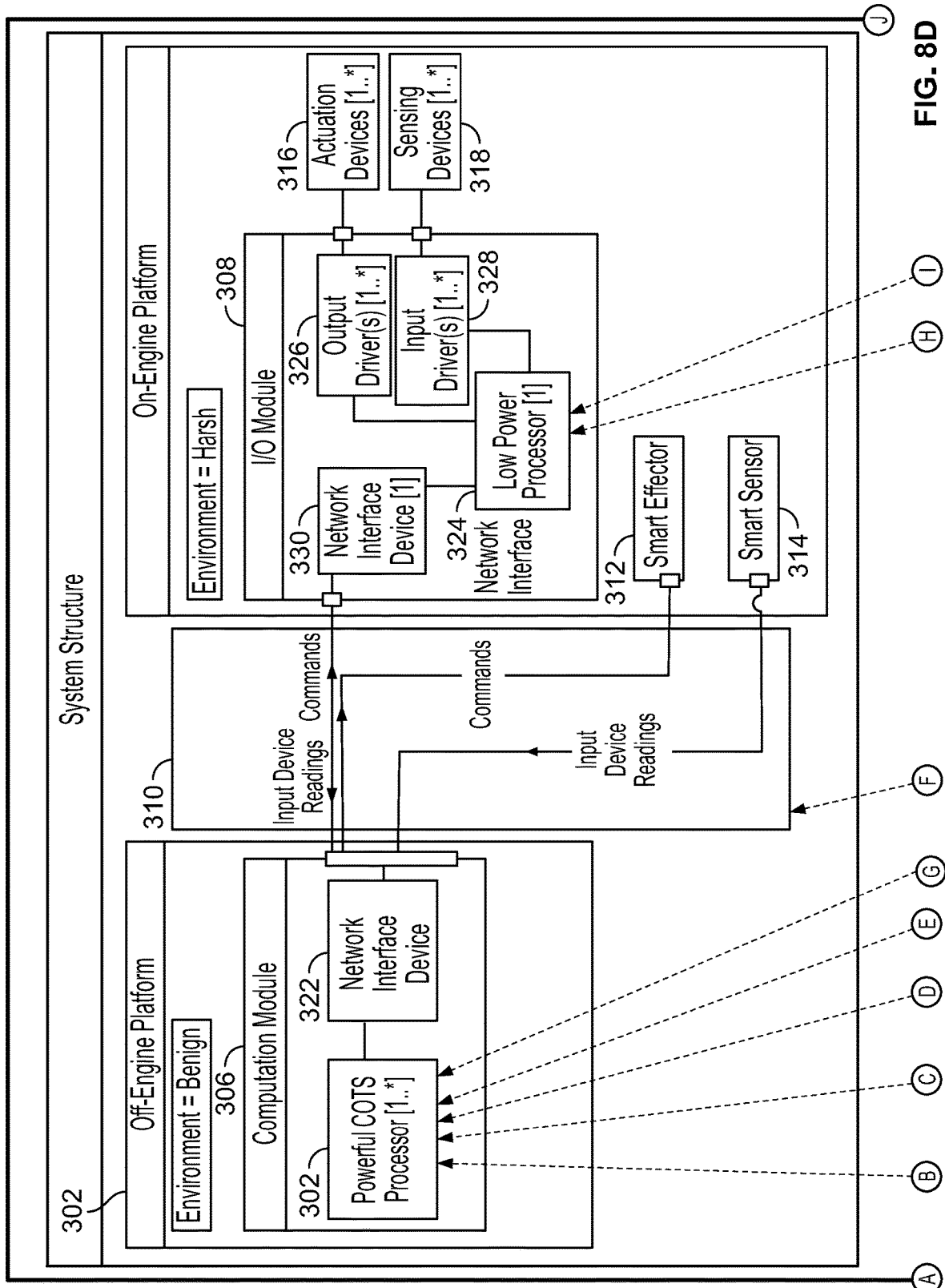
FIG. 8D is another block diagram of an allocation of system functions to the engine control system of FIG. 3B in accordance with some embodiments.
Figure 8D:
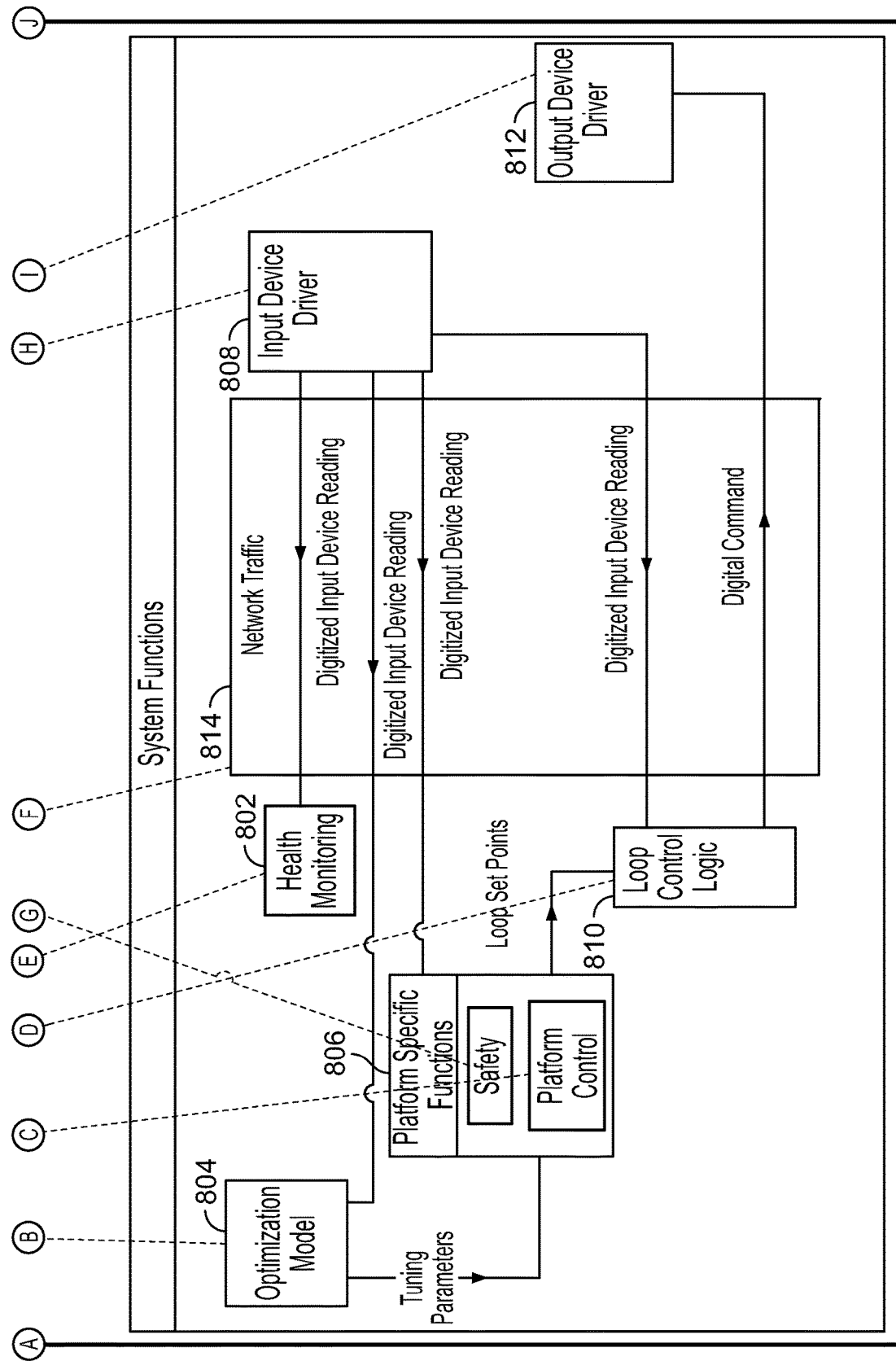

FIG. 8D is another illustration of a block diagram of the allocation of system functions to the engine control system 300 of FIG. 3B. As illustrated, health monitoring functions 802, loop control functions 810, and optimization model functions 804 are assigned to the one or more powerful COTS processors 320 of computation module 306. Here, however, the platform specific functions 806 including the safety functions and the platform control functions are assigned to the one or more powerful COTS processors 320 of computation module 306. Input device driver 808 and output device driver 812 (e.g., data input/output (I/O) functions) are assigned to the one or more low power processors 324 of I/O module 308. Because there is a reduction in processing power for processors that can meet the environmental conditions as well as space constraints on the engine, more processing tasks are assigned to the one or more powerful COTS processors 320. For example, one or more low power processors 324 are assigned only data I/O functions.

Figure 9A:
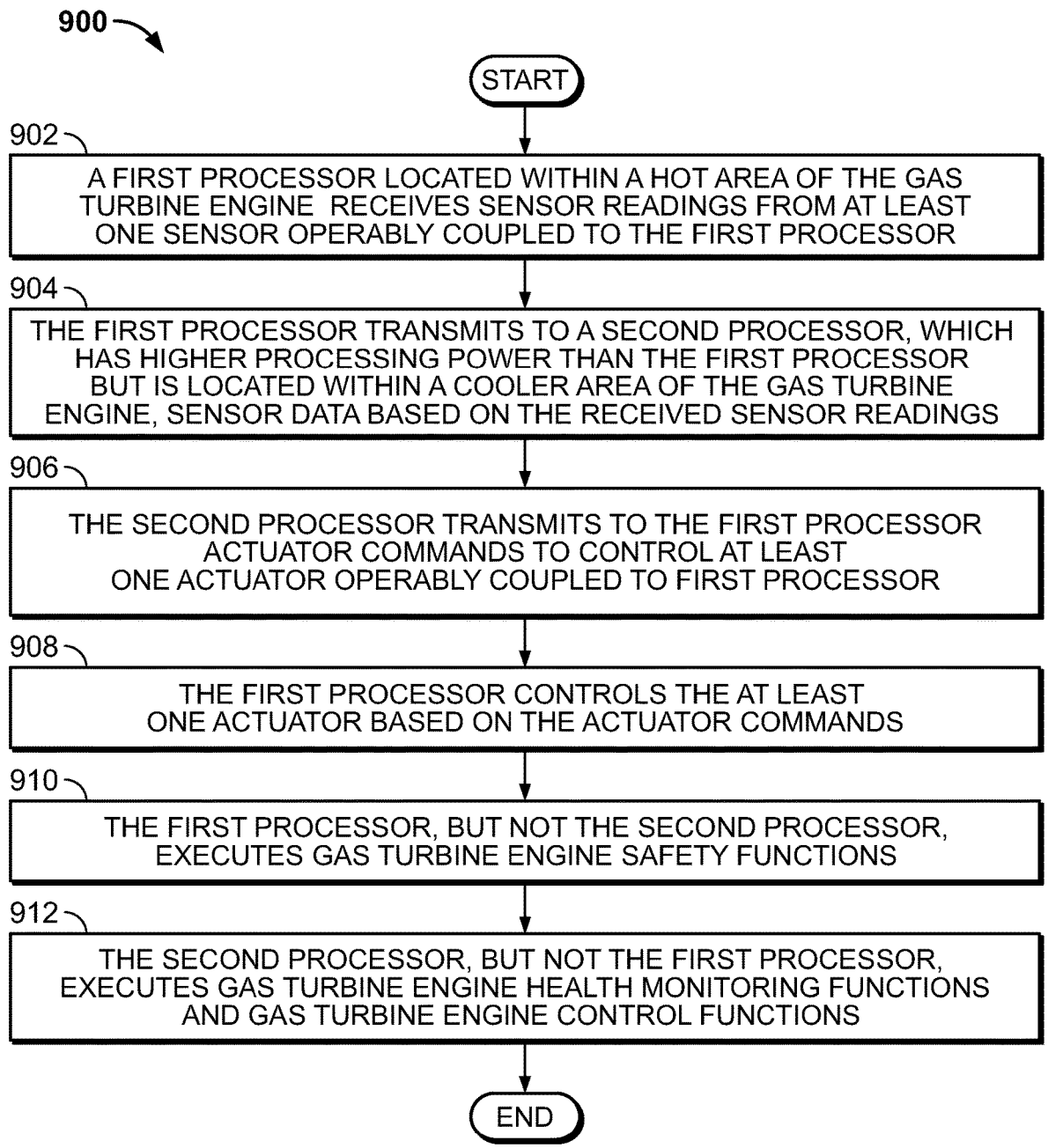
FIG. 9A is a flowchart of an example method that can be carried out by the engine control system of FIG. 3A in accordance with some embodiments.

FIG. 9A is a flowchart of an example method 900 that can be carried out by, for example, the engine control system 300 of FIG. 3A. Although this and other methods are described with reference to the illustrated flowcharts, it will be appreciated that many other ways of performing the acts associated with the methods may be used. For example, the order of some operations may be changed, and some of the operations described may be optional.

Beginning at step 902, a first processor located within a hot area of the gas turbine engine receives sensor readings from at least one sensor operably coupled to the first processor. The first processor may be, for example, a low power processor of the one or more low power processors 324 of I/O module 308 of FIG. 3. At step 904, the first processor transmits to a second processor, which has higher processing power than the first processor and but is located within a cooler area of the gas turbine engine, sensor data based on the received sensor readings. The second processor may be, for example, a powerful COTS processor of the one or more powerful COTS processors 320 of computation module 306 of FIG. 3.

At step 906, the second processor transmits to the first processor actuator commands to control at least one actuator operably coupled to first processor. At step 908, the first processor controls the at least one actuator based on the actuator commands. At step 910, the first processor, but not the second processor, executes gas turbine engine safety functions. At step 912, the second processor, but not the first processor, executes gas turbine engine health monitoring functions and gas turbine engine platform control functions.

Figure 9B:
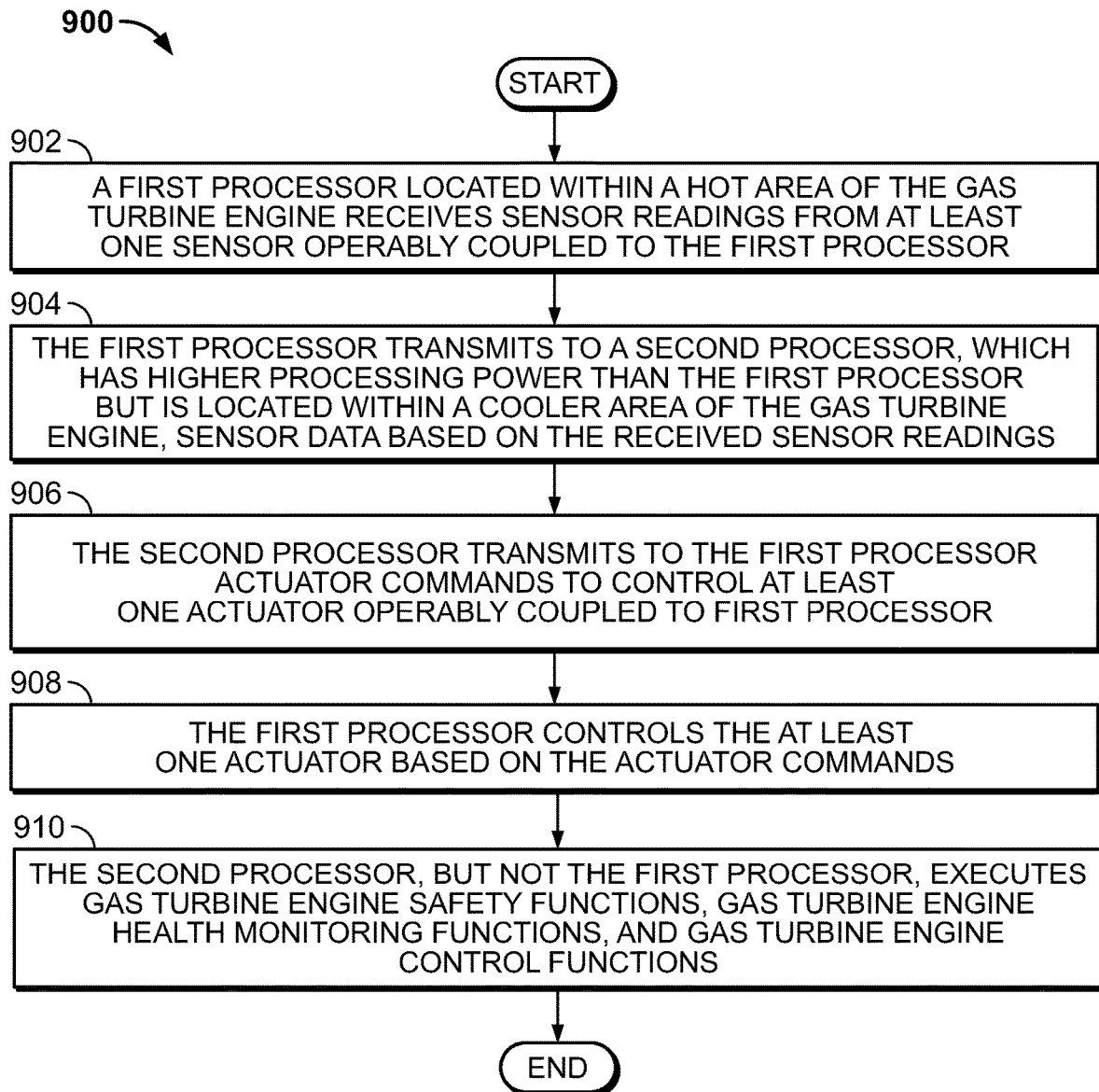
FIG. 9B is a flowchart of an example method that can be carried out by the engine control system of FIG. 3A in accordance with some embodiments.

FIG. 9B is a flowchart of another example method 900 that can be carried out by, for example, the engine control system 300 of FIG. 3A. Beginning at step 902, a first processor located within a hot area of the gas turbine engine receives sensor readings from at least one sensor operably coupled to the first processor. The first processor may be, for example, a low power processor of the one or more low power processors 324 of I/O module 308 of FIG. 3. At step 904, the first processor transmits to a second processor, which has higher processing power than the first processor and but is located within a cooler area of the gas turbine engine, sensor data based on the received sensor readings. The second processor may be, for example, a powerful COTS processor of the one or more powerful COTS processors 320 of computation module 306 of FIG. 3.

At step 906, the second processor transmits to the first processor actuator commands to control at least one actuator operably coupled to first processor. At step 908, the first processor controls the at least one actuator based on the actuator commands. At step 910, the first processor, but not the second processor, executes gas turbine engine safety functions, gas turbine engine health monitoring functions, and gas turbine engine platform control functions.

Figure 9C:
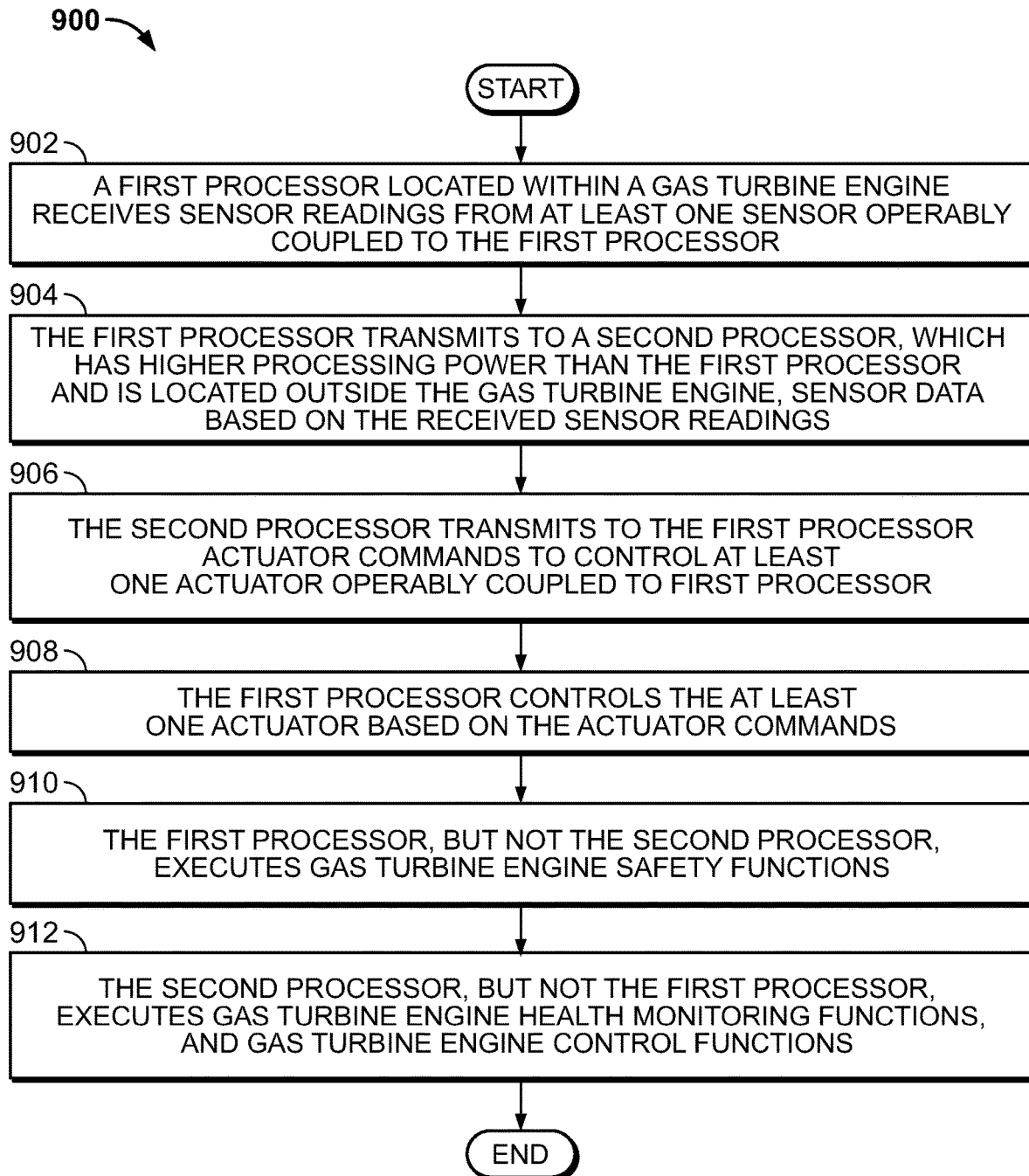
FIG. 9C is a flowchart of an example method that can be carried out by the engine control system of FIG. 3B in accordance with some embodiments.

FIG. 9C is a flowchart of an example method 900 that can be carried out by, for example, the engine control system 300 of FIG. 3B. At step 902, a first processor located within a gas turbine engine receives sensor readings from at least one sensor operably coupled to the first processor. The first processor may be, for example, a low power COTS processor of the one or more low power COTS processors 324 of I/O module 308 of FIG. 3. At step 904, the first processor transmits to a second processor, which has higher processing power than the first processor and is located outside the gas turbine engine, sensor data based on the received sensor readings. The second processor may be, for example, a powerful COTS processor of the one or more powerful COTS processors 320 of computation module 306 of FIG. 3.

At step 906, the second processor transmits to the first processor actuator commands to control at least one actuator operably coupled to first processor. At step 908, the first processor controls the at least one actuator based on the actuator commands. At step 910, the first processor, but not the second processor, executes gas turbine engine safety functions. At step 912, the second processor, but not the first processor, executes gas turbine engine health monitoring functions and gas turbine engine platform control functions.

Figure 9D:
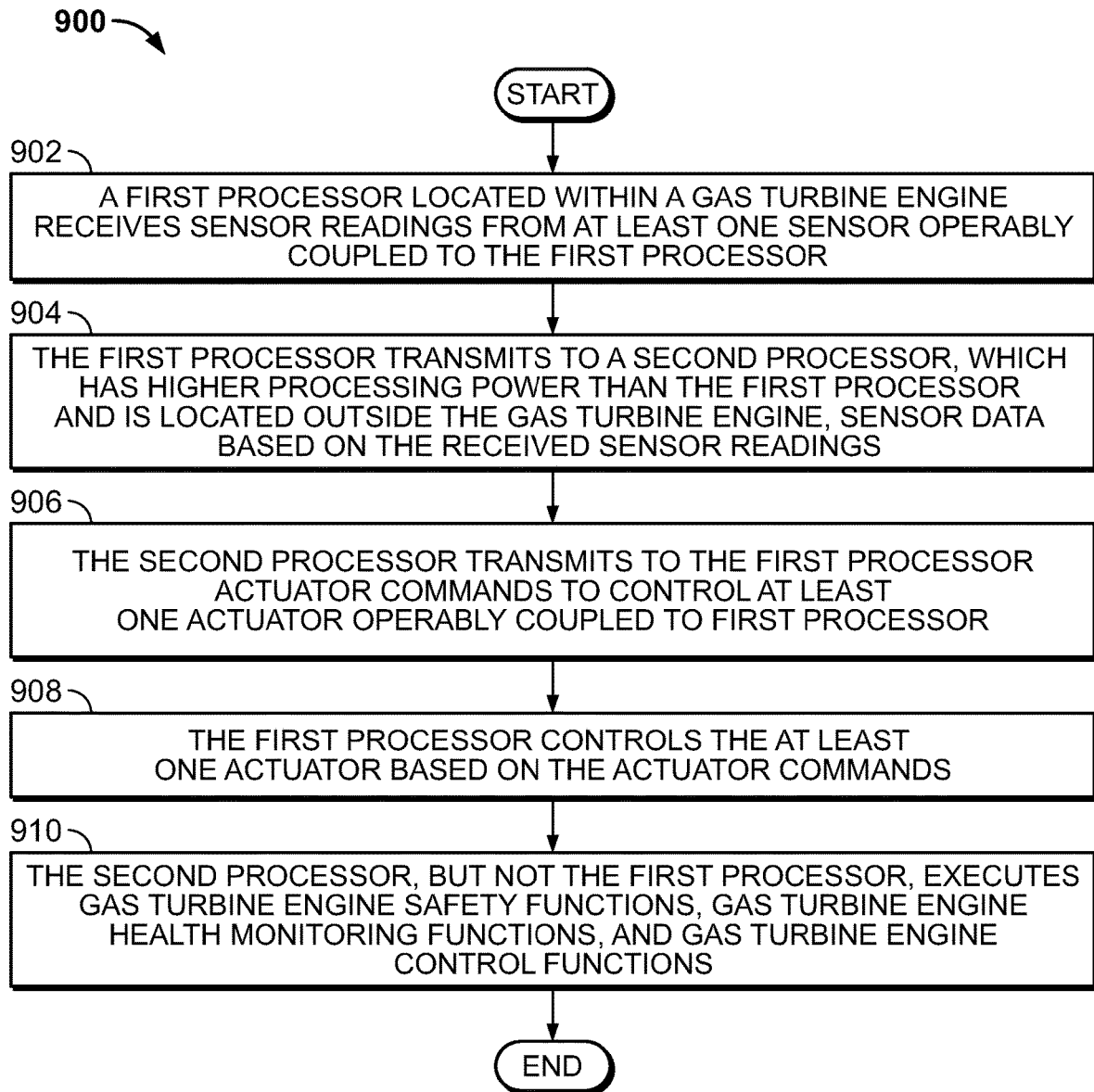
FIG. 9D is a flowchart of an example method that can be carried out by the engine control system of FIG. 3B in accordance with some embodiments.

FIG. 9D is a flowchart of another example method 900 that can be carried out by, for example, the engine control system 300 of FIG. 3B. At step 902, a first processor located within a gas turbine engine receives sensor readings from at least one sensor operably coupled to the first processor. The first processor may be, for example, a low power COTS processor of the one or more low power COTS processors 324 of I/O module 308 of FIG. 3. At step 904, the first processor transmits to a second processor, which has higher processing power than the first processor and is located outside the gas turbine engine, sensor data based on the received sensor readings. The second processor may be, for example, a powerful COTS processor of the one or more powerful COTS processors 320 of computation module 306 of FIG. 3.

At step 906, the second processor transmits to the first processor actuator commands to control at least one actuator operably coupled to first processor. At step 908, the first processor controls the at least one actuator based on the actuator commands. At step 910, the second processor, but not the first processor, executes gas turbine engine safety functions, gas turbine engine health monitoring functions, and gas turbine engine platform control functions.

Embodiments and variants presented herein address the deficiencies of the prior art. Embodiments advantageously address, safety and customer constrains, size, throughput, processing power, environment, obsolescence, development and life cycle costs, cyber security, unit cost and versatility.

The distributable nature of the described architecture allows the software processing functions to be allocated to any node in the system that meets the computational prerequisites. The engine protection functions (shaft-break & overspeed detection) generally have very small performance requirements, allowing the functionality to be located in any of the modules (e.g. computational module, the I/O module, or one or more intermediate modules). Therefore, depending on the safety requirements and hazard assessment of the control system, it may be prudent to locate the safety functionality within the I/O module which is closest to the relevant sensors and effectors (i.e. actuators) to prevent a network failure from disabling the engine protection features. Given the implementation of software abstraction, the allocation decision can be made late in program development.

Customer requirements may also dictate the location of computing element(s). If the customer is able to supply the engine control system with space & weight claim (dedicated space and weight allocation) within the customer platform in a benign environment, then this will allow the greatest flexibility in selecting a COTS processor as the environmental constraints are less severe. Space & weight claims on the customer platform are generally not available to the engine maker, and so as discussed previously another embodiment locates the computational module(s) on the engine in the most benign location possible (such as the fan case). In this latter case, the computing element is now facing more restrictive environmental constraints and thus will reduce the number of available COTS components which also likely have reduced performance characteristics. As a result, multiple computing elements (may be required to achieve the desired functionality. Again, with the correct software abstraction and the high-bandwidth network, this is an achievable configuration.

Moving the major computing functions to a more benign environment than the harsh environment associated with the gas turbine allows for a smaller, lower power and more integrated computing device that requires less circuit board area because of small size and fewer required support components. Using smaller, lower functioning supports the use of general purpose, modular DIO systems with lower individual I/O counts and thus smaller form factors. This allows the modules to find mounting locations in the ever shrinking mounting envelopes of modern and future applications.

Data Throughput has been a challenge with the current technology being limited to the capabilities that monolithic systems built to significant environmental stress conditions possess. The architecture associated with the disclosed embodiments by allowing distribution of system functions, allow specific functions to be operated directly in sequence with only the components of the system that they must interact with and these functions may be spread across nodes such that each computing module may be more dedicated to specific functions. In addition, by replacing traditional copper backed data communications with fiber optic backed data communications, a much higher data throughput rate is obtained in addition to resistance to EMI effects which can cause communication disruptions in traditional copper systems. Lastly, a network backplane allows for rapid communication between software components on the network whom can communicate via several means based on their needs but include peer to peer, publish and subscribe, as well as broadcast communication protocols. This will allow for tailorable communication so that utilized data bandwidth is used as efficiently as possible for the purpose of the system.

In existing applications on-engine thermal soak back is often a limiting factor on the amount of thermal margin present for the FADEC electronics. A control system platform which allows the computational intensive tasks to be performed outside the engine core or completely off-engine will increase the availability of parts, such as those for an automotive environment (−40° C. to 125° C.) to be considered for a design without requiring up-rating or screening to be performed. Generally, more options for higher computational power processors exist as the environment becomes more benign.

In the core processing nodes, a reduction in environmental constraints on the computational components are an advantageous driver to the architectures described. The reduced temperature constraints will allow for selection of components approaching more mainstream commercial off the shelf. This significantly increases ability to have higher power computing capabilities, and may reduce the number of nodes required to service the functions required of the system. Reduced vibration will improve the lifecycle costs and maintenance schedule of the system resulting in a significantly more reliable and lower costing system, additionally this assists in selection of hardware which approaches more commercial off the shelf hardware. Lastly, functionality which operates on components which still suffer from harsh environmental restrictions will still be required, but in these cases the benefit is that these components will have significantly reduced functionality scope and can be built smaller and tailored for its purpose.

Processor obsolescence is also as addresses above a major concern for aerospace applications. The normal consumer electronics lifecycle runs about 6 years. For automotive the lifecycle is around 10 years. Aerospace electronics often have production lifecycles longer than 20 years. The obsolescence problem is compounded for complex electronic COTS components used in high integrity systems because often a certain level of service experience is required to demonstrate the COTS component is reliable and without undocumented flaws. This service experience requirement, along with the application development period, reduces the number of years the part is available for production, however, the architecture of the embodiments described herein minimized these issues, by distributing functions to more benign environments and abstracting software.

The major cost in replacing a processor is the burden of retargeting the existing software. Abstraction concepts in software design can lower this burden. By writing application software to interact with a defined operating system API the application software can become processor agnostic, as long as the operating system fully abstracts the underlying hardware. If this is done, then the operating system becomes the only piece of software that is required to be updated when a processor is updated.

The level of effort required to retargeting the operating system depends on the amount of hardware peripherals the operating system is required to interact with. The distributed I/O module (DIO) handles analog sensor inputs and effector outputs. The "all-digital" central processing element on which all of the control law, engine health monitoring, and control system modeling software resides. The central processing element will have the majority of the control system & monitoring software, but the least amount of hardware dependent software. The DIO elements will have a minority of software and most of it will be hardware dependent.

Separate obsolescence strategies may also be employed for the component parts. For the DIO, the strategy may be to employ a proprietary ASIC to achieve the required functions, which would lower the risk of obsolescence. The central computing element strategy may rely on COTS solutions, since the penalty for retargeting is smaller.

System development costs in this architecture are significantly reduced due to a couple of key features. Component modularity, which allows for atomic functionality to be reused across applications, therefore limiting development costs to integration efforts in subsequent uses and by promoting cost saving standardization of technology since the business case to reuse built components will be very strong. Additionally, these components when built within modular architecture guidelines will reduce the cost of software verification as they will adhere to limited and only necessary interfaces built on a standard base platform.

As previously mentioned, a differentiating characteristic of this architecture is by separation of functions on nodes removed of extreme environmental conditions and those which will still have these constraints, with the latter ones being built for purpose with only necessary functions applied. This will realize lifecycle cost savings in that these components can be maintained in that they can be fully replaced at lower cost that the current monolithic control and monitoring systems are today. The hardware and software on these may be minimalistic and maintenance scope will be significantly reduced. Additionally, because each component is scoped in a minimalistic atomic approach then it will be easier to perform feature specific maintenance which reduces the verification and validation cost of software updates to resolve discovered issues along with reduced scope certification efforts.

Cyber security is a key aspect of this architecture; it is required to reduce threats and risks to a distributed architecture and is increasingly an area of interest to customers. This will be handled in multiple ways but notably building a fiber optics based data network is critical to this goal. Fiber optics have reduced risks of tampering and improved capability to detect tampering, additionally they increase the difficulty of being read/interfered with remotely in part due to their EMI characteristics. Additionally, the data backplane will be secured with a layered approach to cyber security to minimize the risks coming from connected systems and ensure that components of the system become more aware of correct behavior and detection of malicious or defective behavior.

This described architectures allow for distributed functionality through hardware distribution. This allows the hardware to do the highly complex algorithms and data manipulations to be done separately from data acquisition. This enables the use of high processing power COTS electronics mounted in a less hostile environment for these functions. Re-use of these components across multiple applications will lead to significant reductions in cost.

The DIO modules may be equipped with general purpose interfacing hardware and processing. These general purpose resources enable the DIO to be deployed on any application. Connecting the DIO to the network and the software product line strategy enables deployment on new platforms by scaling the system; that is deploying more or fewer DIOs according to the platform's needs without change to the DIO hardware and software.

Although examples are illustrated and described herein, embodiments are nevertheless not limited to the details shown, since various modifications and structural changes may be made therein by those of ordinary skill within the scope and range of equivalents of the claims.

What is claimed is:

1. A distributed control system for a gas turbine engine, the gas turbine engine defining during operation a benign environment associated with at least one location and a harsh environment associated with at least another location, the gas turbine engine comprising:
   an input/output (I/O) module attached to the gas turbine engine comprising:
      a first processor; and
      a first network interface device operably coupled to the first processor;
   at least one sensor operably coupled to the I/O module providing a signal to the first processor, the signal based on sensed conditions of the gas turbine engine;
   at least one actuator operably coupled to the (I/O) module and controlled by the first processor; and
   a computation module attached to the gas turbine engine comprising:
      a second processor with higher processing power than the first processor; and
      a second network interface device operably coupled to the second processor, wherein the second network interface device and the first network interface device provide a communication network between the first processor and the second processor, wherein the first processor is configured to execute gas turbine engine safety functions, wherein the computation module is located in the benign environment and the I/O module is located in the harsh environment, wherein the first processor is configured to execute a first software architecture comprising:
      a hardware abstraction layer that interfaces with an operating system; and
      at least one device driver that interfaces with the hardware abstraction layer.

2. The control system of claim 1 wherein the benign environment of the computation module is one that is cooler than the environment that the (I/O) module is subject to during operation of the gas turbine engine.

3. The control system of claim 1 wherein the second processor is configured to execute a second software architecture comprising:
   a first component oriented application;
   a first data back plane that interfaces with the first component oriented application;
   a second component oriented application;
   a second data back plane that interfaces with the second component oriented application;
   a hypervisor;
   a RTOS that interfaces to the first data back plane, the second data back plane, and the hypervisor;
   a hardware abstraction layer that interfaces to the hypervisor; and
   at least one network device driver that interfaces with the hardware abstraction layer.

4. The control system of claim 1 wherein the second processor receives data based on the signal of the at least one sensor from the first processor over the communication network.

5. The control system of claim 1 wherein the second processor transmits commands to the first processor over the communication network to control the at least one actuator.

6. The control system of claim 1 wherein the (I/O) module further comprises:
   a data input interface operably coupled to the first processor, wherein the at least one sensor is configured to provide the signal via the data input interface to the first processor; and
   a data output interface operably coupled to the first processor, wherein the at least one actuator operably is controlled by the first processor via the data output interface.

7. The control system of claim 4 wherein the first processor executes data I/O functions via the data input interface, the data output interface, and the first network interface device.

8. The control system of claim 1 wherein the communication network is a fiber optic network.

9. The control system of claim 1 comprising at least one smart sensor configured to determine a condition of the gas turbine engine based on smart sensor readings of the gas turbine engine, wherein the at least one smart sensor is operably coupled to the second network interface, and wherein the second processor is configured to communicate with the at least one smart sensor via the second network interface.

10. The control system of claim 1 wherein the second processor executes gas turbine engine health monitoring functions and gas turbine engine control functions.

11. The control system of claim 1 wherein the second processor is positioned farther from combusted gases of the gas turbine engine that the first processor.

12. The control system of claim 1 wherein the second processor is positioned axially forward of the first processor.

13. The control system of claim 1, wherein the second processor is positioned radially outward of the first processor.

14. The control system of claim 1, wherein the processing power is selected from the group consisting of processing speed and memory.

15. The control system of claim 1, wherein the benign environment of the computation module is one that has less dynamic loading than the harsh environment that the (I/O) module is subject to during operation of the gas turbine.

16. The control system of claim 1 wherein the first software architecture further comprises:
an application; and
a data back plane that interfaces with the application,
wherein the operating system is a real time operating system (RTOS) that interfaces with the data back plane.

17. An aircraft comprising:
an aircraft engine; and
a control system comprising:
   a first processor located within the aircraft engine and operably coupled to a first network interface device;
   at least one sensor located within the aircraft engine that provides signals to the first processor based on sensed conditions of the gas turbine engine;
   at least one actuator located within the aircraft engine and configured to be controlled by the first processor;
   a second processor located within the aircraft engine that has higher processing power than the first processor; and
   a second network interface device located within the aircraft engine and operably coupled to the second processor, wherein the second network interface device and the first network interface device provide a communication network between the first processor and the second processor, wherein the second processor is operable to receive sensor readings of the at least one sensor from the first processor based on the signals, and transmit commands to the first processor for controlling the at least one actuator, wherein the first processor is configured to execute aircraft engine safety functions, wherein the second processor is located in an area of the gas turbine engine that provides a benign environment and the I/O module is located in an area of the gas turbine engine that provides a harsh environment during operation of the gas turbine engine,
wherein the first processor is configured to execute a first software architecture comprising:
   a hardware abstraction layer that interfaces with an operating system; and
   at least one device driver that interfaces with the hardware abstraction layer.

18. The aircraft of claim 17 wherein the more benign environment of the computation module is one that is cooler than the environment that the (I/O) module is subject to during operation of the gas turbine engine.

19. The aircraft of claim 17, wherein the benign environment of the computation module is one that has less dynamic loading than the harsh environment that the I/O module is subject to during operation of the gas turbine.

20. The aircraft of claim 17 wherein the control system further comprises:
   a data input interface located within the aircraft engine and operably coupled to the first processor, wherein the at least one sensor is configured to provide the sensor readings via the data input interface to the first processor; and
   a data output interface located within the aircraft engine and operably coupled to the first processor, wherein the at least one actuator operably is configured to be controlled by the first processor via the data output interface.

21. A method for controlling a gas turbine engine, the gas turbine engine defining during operation a benign environment associated with at least one location and a harsh environment associated with at least another location, comprising:
   receiving, by a first processor located within the harsh environment of the gas turbine engine from at least one sensor operably coupled to the first processor, sensor readings based on sensed conditions of the gas turbine engine;
   transmitting, by the first processor to a second processor located within the benign environment of the gas turbine engine, sensor data based on the received sensor readings, wherein the second processor has higher processing power than the first processor;
   transmitting, by the second processor to the first processor, actuator commands to control at least one actuator operably coupled to first processor;
   controlling, by the first processor, the at least one actuator based on the actuator commands; and
   executing, by the first processor, gas turbine engine safety functions,.
wherein the first processor is configured to execute a first software architecture comprising:
   a hardware abstraction layer that interfaces with an operating system; and
   at least one device driver that interfaces with the hardware abstraction layer.

\* \* \* \* \*